US007082608B1

(12) United States Patent
Wilson et al.

(10) Patent No.: US 7,082,608 B1
(45) Date of Patent: Jul. 25, 2006

(54) OBJECT-BASED ARCHITECTURE FOR SUPPORTING NETWORK DEVICES

(75) Inventors: Richard Wilson, Coto de Caza, CA (US); John Barnard, Orange, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1018 days.

(21) Appl. No.: 09/664,531

(22) Filed: Sep. 18, 2000

(51) Int. Cl.
*G06F 9/44* (2006.01)

(52) U.S. Cl. .................. 719/315; 719/313; 719/328; 709/223

(58) Field of Classification Search ............... 719/313, 719/315, 328; 709/223
See application file for complete search history.

(56) References Cited

U.S. PATENT DOCUMENTS

| | | | | |
|---|---|---|---|---|
| 5,926,539 | A | * | 7/1999 | Shtivelman ............ 379/266.01 |
| 6,073,184 | A | * | 6/2000 | Couturier et al. ........... 719/313 |
| 6,389,466 | B1 | * | 5/2002 | Zondag ...................... 709/221 |
| 6,466,984 | B1 | * | 10/2002 | Naveh et al. ............... 709/228 |
| 6,694,363 | B1 | * | 2/2004 | Yamadaji et al. ........... 709/223 |

OTHER PUBLICATIONS

Satyendra Yadav et al., "The Phoenix Framework: A Practical Architecture for Programmable Networks," Intel Technology Journal, Q3 1999 Issue, p. 1-7.*

Prosise, J., "Wicked Code", Microsoft Systems Journal, Nov. 1999.

* cited by examiner

*Primary Examiner*—William Thomson
*Assistant Examiner*—Li Zhen
(74) *Attorney, Agent, or Firm*—Fitzpatrick, Cella, Harper & Scinto

(57) ABSTRACT

Providing a virtual device container to virtually extend the functionality of a network device on a network for supporting a plurality of functional application modules residing in a server on the network, including receiving a function request sent from one of the functional application modules, the function request corresponding to the network device, and selecting one of a plurality of functional component modules in response to the function request, each of the functional component modules corresponding to a respective one of the functional application modules, the selected functional component module corresponding to the functional application module which sent the function request. The virtual device container also includes executing the selected functional component module according to the function request, wherein each functional component module communicates with the corresponding functional application module through a first interface and communicates with the network device through a second interface.

54 Claims, 16 Drawing Sheets

OBJECT-BASED ARCHITECTURE FOR SUPPORTING NETWORK DEVICES

BACKGROUND OF THE INVENTION

1. Field of the Invention

The invention concerns an object-based architecture of software components for extending the functional and communication capabilities of existing network devices in a network environment. Specifically, the invention utilizes modular software components to provide a virtual device for extending the functional capability of a network device in order to support enterprise applications.

2. Description of the Related Art

Typically, computing network environments are comprised of numerous network elements, such as workstations and servers, in addition to several types of network devices, such as network printers, network scanners, and the like. For example, a network enterprise may consist of several different network servers and a large number of network devices, such as network printers and network scanners, wherein the functional capabilities of each network device are accessible to the users of the network enterprise through workstations on the network.

The accessibility to the functionality of the various network devices allows each user on the network to utilize the network devices as if they were local peripheral devices to the user's workstation. In this manner, the servers, workstations and other network devices on the network all communicate via the network using a common network protocol, such as TCP/IP, in order to make themselves visible for access and use by other network elements.

The architecture of such a network enterprise facilitates the implementation of enterprise-wide functionality for managing and/or utilizing the capabilities of the network devices on the network. For example, many different enterprise applications have been developed for use in network environments which provide functionality to efficiently use and communicate between the various network elements in a coordinated fashion. An enterprise application may be executed within a single server or computing device on the network, or may be processed in a distributed manner among several servers and/or computing devices on the network. For example, an enterprise e-mail application may be implemented in a server on a network to facilitate e-mail communication among all network elements in the network enterprise. Accordingly, an e-mail client containing the appropriate e-mail functionality is typically provided in each workstation in order for the workstations to functionally support the enterprise e-mail enterprise. Other examples of enterprise applications include, but are not limited to, network management applications for controlling network configurations and settings of the network elements, policy management applications for managing the use of the network elements, job accounting management applications for tracking the use of the network elements, and security applications for ensuring secure use of the network elements.

A growing trend among developers of network devices, such as printers and scanners, is to include enterprise application client functionality in the network device, thereby allowing the network device to support the corresponding enterprise applications on the network. Accordingly, it can be appreciated that new network devices are being developed to include embedded functional capability to not only support existing enterprise applications, such as e-mail, but also to support developing enterprise applications, such as policy management and security applications. In this manner, the users of the network, such as a user at a workstation on the network, will have the benefit of accessing and utilizing increased functional capabilities of the network devices, such as e-mail printing to a network printer, through the use of enterprise applications.

As new network devices are added to the network which include the functional capability to support enterprise applications, the network environment becomes a heterogeneous environment of newer network devices which support enterprise applications and of legacy devices that are not capable of supporting such enterprise applications. In addition, even among those newly-added network devices which have the capability to support enterprise applications, there is likely to be a disparity of the type and level of embedded functional capability to support the various enterprise applications. For example, a newly-added network printer may have the embedded functionality to support an enterprise e-mail application and a network management application, whereas another newly-added network printer may only support the enterprise e-mail application in a limited fashion and may not support the network management application at all.

In addition to lacking the capability to support enterprise applications, many of the network devices, especially the legacy network devices, may only support limited sets of communications protocols, thereby inhibiting their ability to communicate with other network devices which utilize other communication protocols. Accordingly, it can be appreciated that existing, and particularly newly-developed, enterprise applications may have limited overall support within the network enterprise because of the limited number of network devices that have the embedded functional capability to support such enterprise applications. In addition, the functional capabilities of some network devices which utilize particular communications protocols to access and utilize the functions of other network devices is limited by the network devices which cannot support such protocols.

It is therefore desirable to maintain a network enterprise in which all network devices support each of the enterprise applications and communication protocols available across the network enterprise. This implementation of this goal is restricted, however, by the limited capabilities of legacy network devices in the network enterprise, and also by the disparate functional capabilities of newly-developed network devices. Accordingly, there is a need for extending the functional capabilities of network devices, especially legacy network devices, so as to enable the network devices to have the functional capability necessary to support the desired enterprise applications. In addition, there is a need to extend the communications capabilities of the network devices, especially legacy network devices, to support the desired communication protocols on the network.

One solution to the aforementioned problems is to design and implement a software proxy which can be executed on a computing platform, where the software proxy provides the communication interfaces and functional capabilities to support the desired enterprise applications for the legacy devices. This solution is inefficient and cumbersome, however, because it requires modification of the software proxy every time that support for a new or modified enterprise application is required for the legacy network devices. Accordingly, a consistent scheme is desired for the functional extension of network devices to support enterprise applications and protocols in an efficient and reliable manner.

SUMMARY OF THE INVENTION

The present invention addresses the foregoing problems by providing an open, object-oriented architecture which virtually extends the functionality of a network device, particularly a legacy network device. Specifically, the invention provides a software implementation of a virtual device container which virtually represents additional functionality of a network device, as if the additional functionality were embedded in the network device. In this manner, a legacy device can be made to appear to other devices on the network as if the legacy device has the embedded functionality to support new enterprise-wide applications, such as e-mail printing, security applications, network management applications, job tracking applications, resource management applications and the like. This transparent virtual extension of the functionality of legacy devices is implemented through object-based modules so that new functions can be added for network devices in a simple and efficient manner.

Accordingly, one aspect of the invention concerns providing a virtual device container to virtually extend the functionality of a network device on a network for supporting a plurality of functional application modules residing in a server on the network, including receiving a function request sent from one of the functional application modules, the function request corresponding to the network device, and selecting one of a plurality of functional component modules in response to the function request, each of the functional component modules corresponding to a respective one of the functional application modules, the selected functional component module corresponding to the functional application module which sent the function request. The virtual device container also includes executing the selected functional component module according to the function request, wherein each functional component module communicates with the corresponding functional application module through a first interface and communicates with the network device through a second interface.

The invention preferably includes loading, by a functional component keeper module, the functional component module corresponding to each registry entry for the network device in the operating system registry. Preferably, the function request is a function call which is supported by one of the functional component modules. In addition, it is preferred that all functional component modules and functional application modules communicate with each other over a dedicated software bus by using a separate software bus connector module to send and receive software bus messages. A direct connection is preferably established between a requesting one of the functional application modules and the virtual device container over a dedicated software bus by using a globally unique identifier which corresponds to the virtual device container and which is obtained from the virtual device container via the dedicated software bus. The virtual device container preferably obtains the globally unique identifier from an API function call provided by the operating system. Lastly, the plurality of functional component modules is preferably duplicated for extending the functionality of multiple network devices, wherein each functional application module is supported by a corresponding functional component module for each network device.

By virtue of the foregoing, an open, object-oriented architecture is provided which virtually extends the functionality of network devices, particularly a legacy network devices. Accordingly, a legacy device can be made to appear to other devices on the network as if the legacy device has the embedded functionality to support new enterprise-wide applications, such as e-mail printing, security applications, network management applications, job tracking applications, resource management applications and the like. This transparent virtual extension of the functionality of legacy devices is implemented through object-based modules so that new functions can be added for network devices in a simple and efficient manner.

According to another aspect, the invention concerns providing a virtual device container to virtually extend the functionality of a network device on a network for supporting a plurality of functional application modules residing in a server on the network, including loading, by a functional component keeper module in the virtual device container, a plurality of functional component modules corresponding to a plurality of registry entries in an operating system registry, each of the functional component modules corresponding to a respective one of the functional application modules. The invention further includes establishing a direct connection between a requesting one of the functional application modules and the virtual device container over a dedicated software bus by using a globally unique identifier which corresponds to the virtual device container and which is obtained from the virtual device container via the dedicated software bus, and receiving, over the direct connection, a function request sent from the requesting functional application module, the function request corresponding to the network device and containing a function call. In addition, the invention includes selecting one of a plurality of functional component modules for supporting the function call, the selected functional component module corresponding to the requesting functional application module, and executing the selected functional component module according to the function call, wherein each functional component module communicates with the network device through the network.

The invention preferably includes all functional component modules and functional application modules communicating with each other over a dedicated software bus by using a separate software bus connector module to send and receive software bus messages. In addition, the plurality of functional component modules is preferably duplicated for extending the functionality of multiple network devices, wherein each functional application module is supported by a corresponding functional component module for each network device. The virtual device container preferably obtains the globally unique identifier from an API function call provided by the operating system.

By virtue of the foregoing, an open, object-oriented architecture is provided which virtually extends the functionality of network devices, particularly a legacy network devices. Accordingly, a legacy device can be made to appear to other devices on the network as if the legacy device has the embedded functionality to support new enterprise-wide applications, such as e-mail printing, security applications, network management applications, job tracking applications, resource management applications and the like. This transparent virtual extension of the functionality of legacy devices is implemented through object-based modules so that new functions can be added for network devices in a simple and efficient manner.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

The present invention provides an open, object-oriented architecture which virtually extends the functionality of network devices on a network, particularly legacy network devices. The invention accomplishes this virtual functional extension by utilizing a software implementation of a virtual device container which virtually represents the desired additional functionality of a given network device, as if the additional functionality were embedded in the network device. In this manner, a legacy device can be made to appear to other devices on the network as if the legacy device has the embedded functionality to support enterprise-wide applications which the legacy device could otherwise not support. Such enterprise-wide applications include e-mail printing, security applications, network management applications, job tracking applications, resource management applications, and the like. This transparent virtual extension of a legacy device's functionality is implemented through a software architecture of object-based modules so that new functions can be added for existing, and new, network devices in a simple and efficient manner. Moreover, the virtual device container provides the same external functional representation for each network device on a network, so that all network devices on the network can be made to support the same set of network-based functional capabilities.

Figure 1:
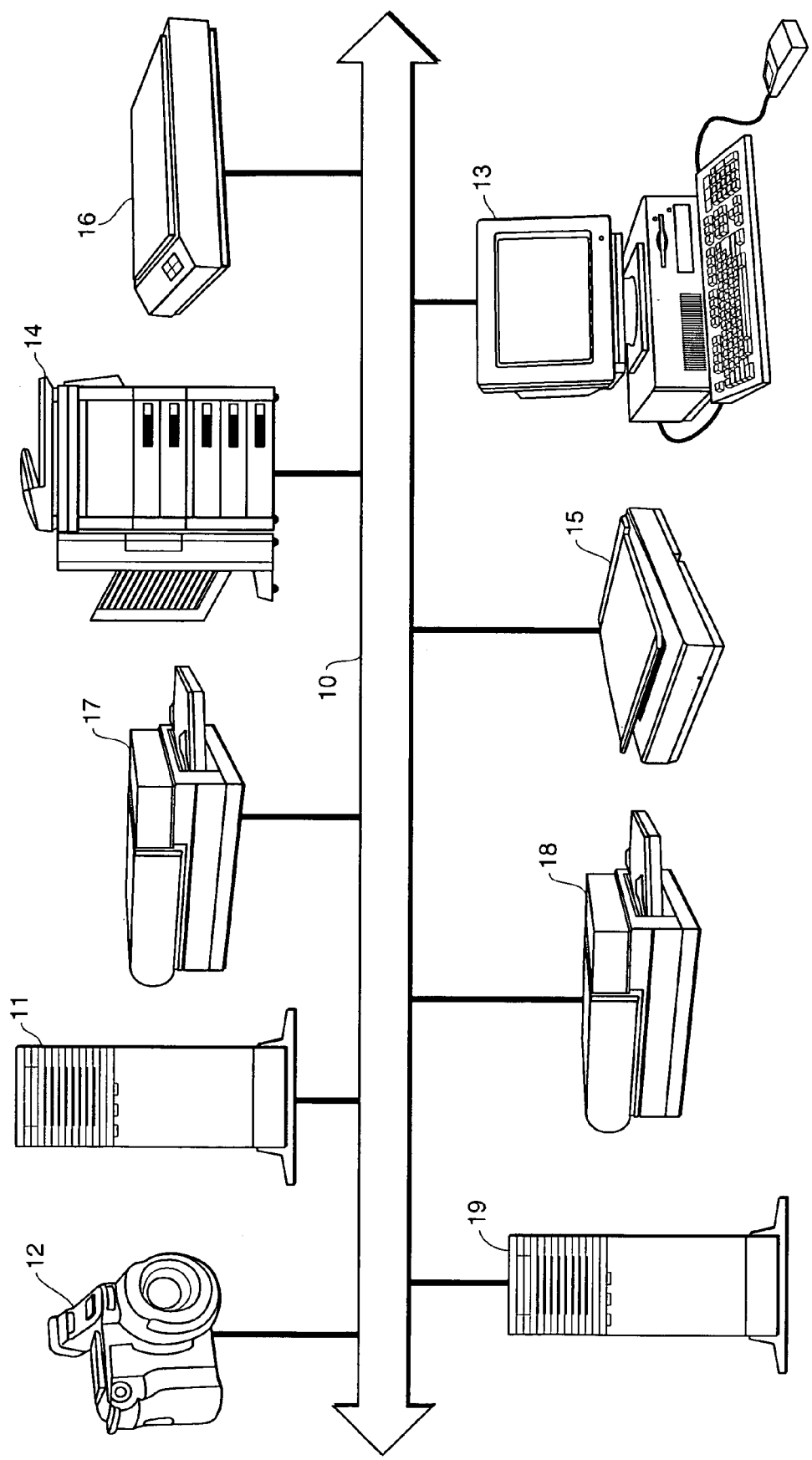
FIG. 1 is a block diagram for illustrating a network environment in which the present invention may be practiced.

FIG. 1 depicts a network environment in which the invention may be practiced. As seen in FIG. 1, network 10 includes servers 11 and 19, computer 13, and several network devices including digital camera 12, digital copier 14, digital scanner 16, and digital printers 15, 17 and 18. Network 10 may be a local area network (LAN), a wide area network (WAN), or any other type of network which supports TCP/IP, and other protocols discussed below. In the network environment of FIG. 1, server 11 is used to implement the object-based architecture of the present invention, although the architecture can also operate across several computing platforms, such as server 19, in a distributed manner. The function of server 11 will be explained more fully below. Server 19 is similar to server 11 and can also be used to implement the present invention as explained herein. Computer 13 is a typical personal computer for executing third-party applications, such as a network management tool, thereby allowing a user, such as a system administrator, to manage the network configuration of network devices on network 10 from computer 13. Accordingly, computer 13 also has a network management application as discussed more fully below.

As discussed above, each of digital camera 12, digital copier 14, digital scanner 16, and printers 15, 17 and 18 have different levels of network functionality. For example, network printer 15 may have the functional ability to support e-mail printing, while printers 17 and 18 do not. In this manner, network 10 is a heterogeneous environment of network devices having mixed levels of network-application functional capabilities.

Figure 2:
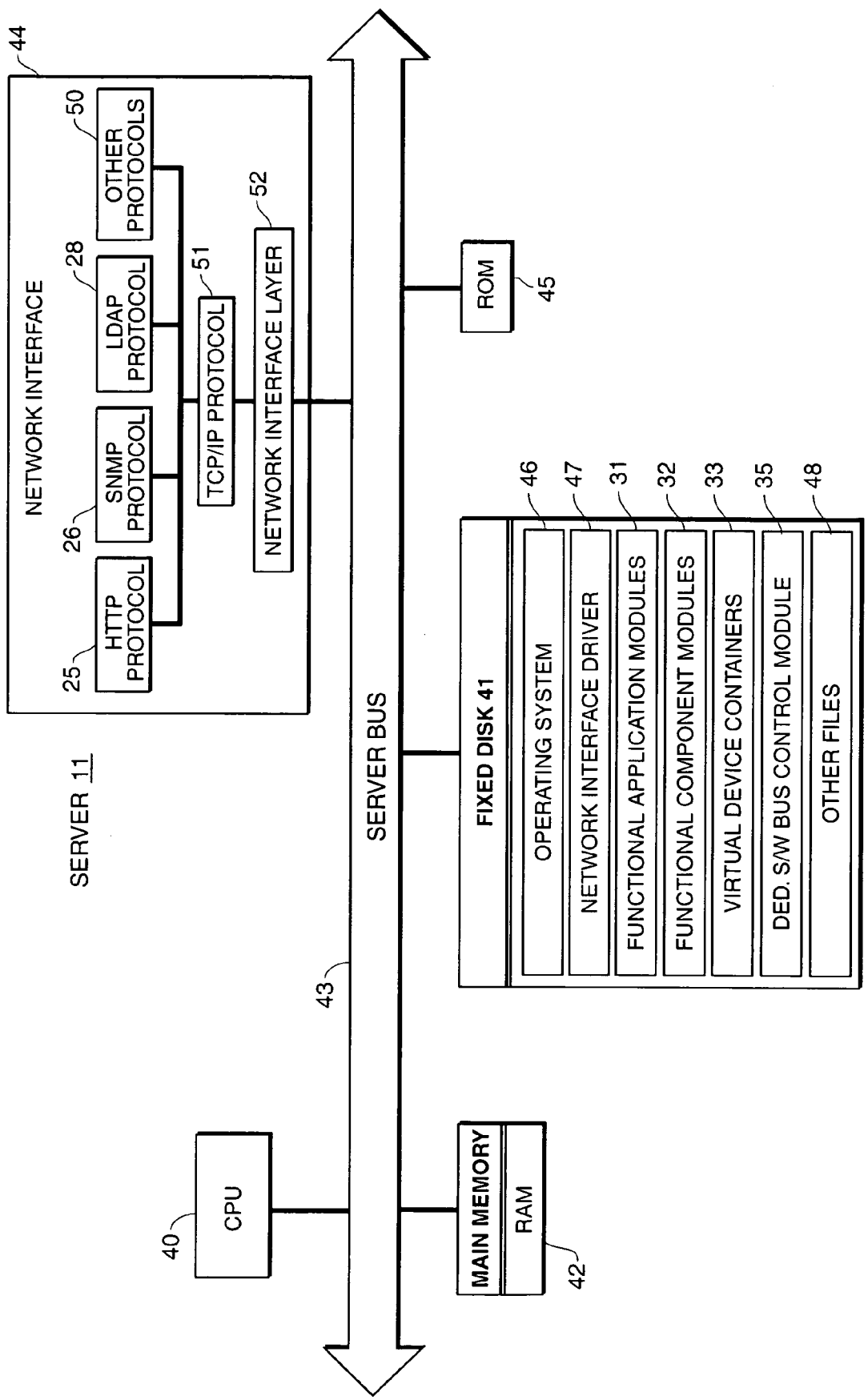
FIG. 2 is a block diagram for explaining the internal architecture of a server according to one embodiment of the present invention.

FIG. 2 is a block diagram for explaining the internal architecture of server 11. In FIG. 2, server 11 is seen to include a central processing unit ("CPU") 40 such as a programmable microprocessor which is interfaced to server bus 43. Also coupled to server bus 43 is a network interface 44 for interfacing to network 10. In addition, random access memory ("RAM") 42, fixed disk 41, and read-only memory ("ROM") 45 are also coupled to server bus 43. RAM 42 interfaces to server bus 43 to provide CPU 40 with access to memory storage, thereby acting as the main run-time memory for CPU 40. In particular, when executing stored program instruction sequences, CPU 40 loads those instruction sequences from fixed disk 41 (or other memory media) into RAM 42 and executes those stored program instruction sequences out of RAM 42. It should also be recognized that standard disk-swapping techniques allow segments of memory to be swapped to and from RAM 42 and fixed disk 41.

ROM 42 stores invariant instruction sequences, such as start-up instruction sequences for CPU 40 or basic input/output operating system ("BIOS") sequences for the operation of peripheral devices which may be attached to server 11 (not shown). Network interface 44 contains several modules to provide the appropriate interface functionality for server 11 according to the present invention. In particular, network interface 44 contains network interface layer 52 which is a low-level protocol layer to interface with network 10. TCP/IP layer 51 is provided above network interface layer 52 for communicating over network 10 via TCP/IP, a standard network protocol. Other protocols 50 are also provided to allow server 11 to communicate over network 10 using other conventional protocols. HTTP protocol 25, SNMP protocol 26, and LDAP protocol 28 are also provided in network interface 44 for allowing server 11 to communicate over network 10 using HTTP, SNMP and LDAP, respectively.

Fixed disk 41 is one example of a computer-readable medium that stores program instruction sequences executable by CPU 40 so as to constitute operating system 45, network interface driver 47, functional application modules (FAMs) 31, functional component modules (FCMs) 32, virtual device containers (VDC) 33, dedicated software bus (DSB) control module 35, and other files 48. As mentioned above, operating system 46 can be an operating system such as DOS, Windows 95, Windows 98, Windows 2000, Windows NT, UNIX, or other such operating system. Network interface driver 47 is utilized to drive network interface 44 for interfacing server 11 to network 10. FAMs 31, FCMs 32, VDCs 33 and DSB control module 35 are utilized to implement the object-based architecture of the invention as described more fully below. Lastly, other files 48 contains other files or programs necessary to operate server 11 and/or to provide additional functionality to server 11.

Figure 3:
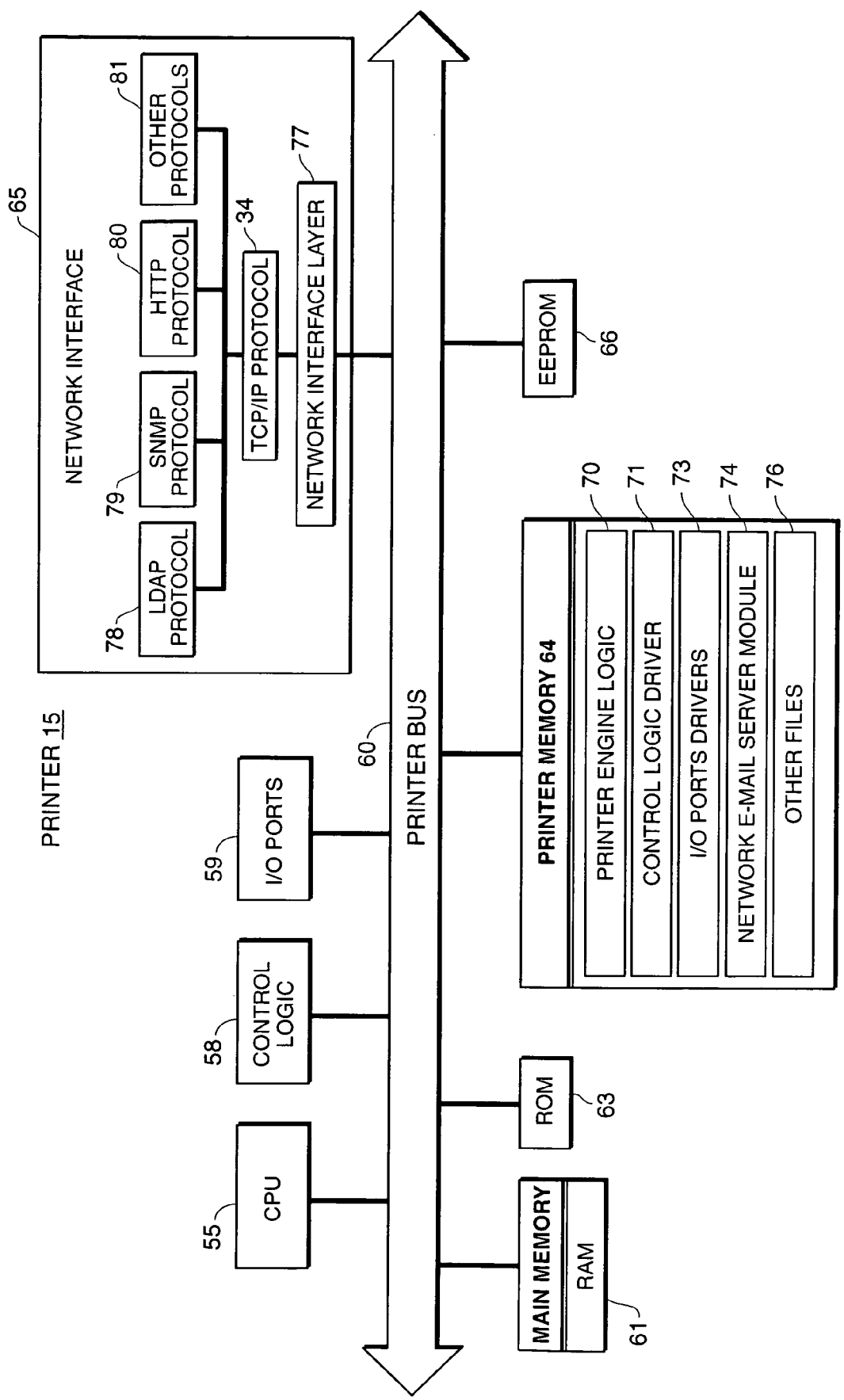
FIG. 3 is a block diagram for explaining the internal architecture of a printer according to one embodiment of the present invention.

FIG. 3 is a block diagram showing an overview of the internal architecture of network printer 15. In FIG. 3, network printer 15 is seen to contain a central processing unit ("CPU") 55 such as a programmable microprocessor which is interfaced to printer bus 60. Also coupled to printer bus 60 are control logic 58, which is utilized to control the printer engine of network printer 15 (not shown), I/O ports 59 which is used to communicate with various input/output devices of network printer 15 (not shown), and network interface 65 which is utilized to interface network printer 15 to network 10. Network interface 65 contains several modules to provide the appropriate interface functionality for network printer 15 according to the present invention.

In particular, network interface 65 contains network interface layer 77 which is a low-level protocol layer to interface with network 10. TCP/IP layer 34 is provided above network interface layer 77 for communicating over network 10 via TCP/IP, a standard network protocol. In the next layer of network interface 44, HTTP protocol 80, SNMP protocol 79 and LDAP protocol 78 are provided for allowing network printer 15 to communicate over network 10 using HTTP, SNMP and LDAP protocols. Other protocols 81 are also provided to allow network printer 15 to communicate over network 10 using other conventional protocols.

Also coupled to printer bus 60 are EEPROM 66, for containing nonvolatile program instructions, random access memory ("RAM") 61, printer memory 64 and read-only memory ("ROM") 63. RAM 61 interfaces to printer bus 60 to provide CPU 55 with access to memory storage, thereby acting as the main run-time memory for CPU 55. In particular, when executing stored program instruction sequences, CPU 55 loads those instruction sequences from printer memory 64 (or other memory media) into RAM 61 and executes those stored program instruction sequences out of RAM 61. ROM 63 stores invariant instruction sequences, such as start-up instruction sequences for CPU 55 or BIOS sequences for the operation of various peripheral devices of network printer 15 (not shown).

Printer memory 64 is one example of a computer-readable medium that stores program instruction sequences executable by CPU 55 so as to constitute printer engine logic 70, control logic driver 71, I/O port drivers 73, network e-mail server module 74, and other files 76. Printer engine logic 70 and control logic driver 71 are utilized to control and drive the printer engine of network printer 15 (not shown) so as to print an image according to image data received by network printer 15, preferably over network 10. I/O port drivers 73 are utilized to drive the input and output devices (not shown) connected through I/O ports 59. Network e-mail server module 74 is provided to support a network e-mail application for e-mail printing capability, and the like. Finally, other files 76 are used to provide other information and programs necessary for the operation and functionality of network printer 15.

Figure 4:
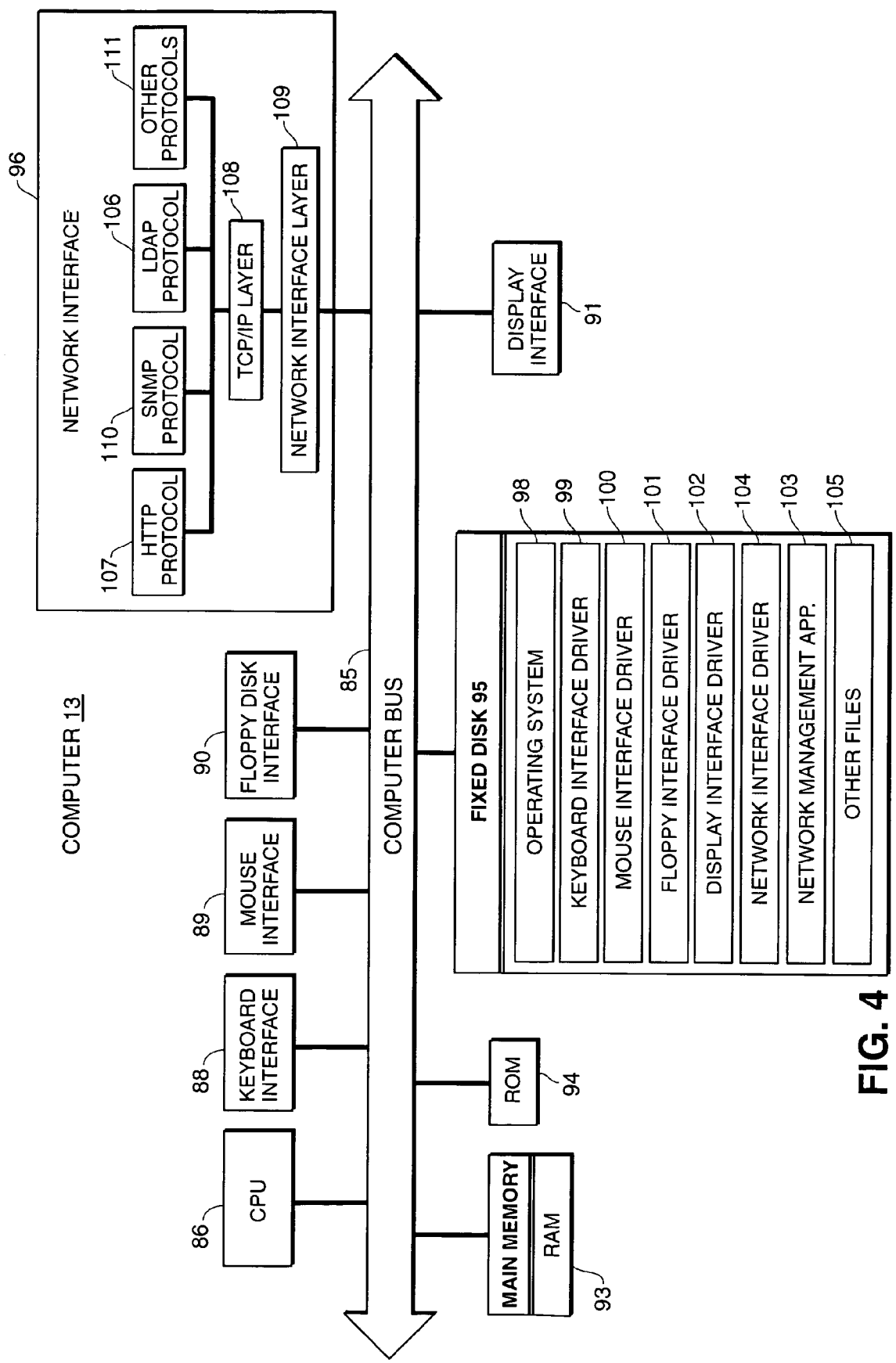
FIG. 4 is a block diagram for explaining the internal architecture of a computer according to one embodiment of the present invention.

FIG. 4 is a block diagram showing an overview of the internal architecture of computer 13. As discussed above, computer 13 is used in the network environment of FIG. 1 to implement third-party network applications, such as a network management application, so that a network user, such as a network administrator, may access, view and modify the network settings of the devices on network 10. In FIG. 4, desktop computer 13 is seen to include central processing unit (CPU) 86 such as a programmable microprocessor which is interfaced to computer bus 85. Also coupled to computer bus 85 are keyboard interface 88 for interfacing to a keyboard, mouse interface 89 for interfacing to a pointing device, such as a mouse, floppy disk interface 90 for interfacing to a floppy disk, display interface 91 for interfacing to a display, and network interface 96 for interfacing to network 10. Network interface 96 contains several modules to provide the appropriate interface functionality for computer 13 according to the present invention.

In particular, network interface 96 contains network interface layer 109 which is a low-level protocol layer to interface with network 10. TCP/IP layer 108 is provided above network interface layer 109 for communicating over network 10 via TCP/IP, a standard network protocol. Other protocols 111 are also provided to allow computer 13 to communicate over network 10 using other conventional protocols. HTTP protocol 107, SNMP protocol 110 and LDAP protocol 106 are also provided in network interface 96 for allowing computer 13 to communicate over network 10 via HTTP, SNMP and LDAP protocols.

Random access memory ("RAM") 93 interfaces to computer bus 85 to provide central processing unit ("CPU") 86 with access to memory storage, thereby acting as the main run-time memory for CPU 86. In particular, when executing stored program instruction sequences, CPU 86 loads those instruction sequences from fixed disk 95 (or other memory media) into random access memory ("RAM") 93 and executes those stored program instruction sequences out of RAM 93. It should also be noted that standard-disk swapping techniques available under windowing operating systems allow segments of memory to be swapped to and from RAM 93 and fixed disk 95. Read-only memory ("ROM") 94 stores invariant instruction sequences, such as start-up instruction sequences for CPU 86 or basic input/output operation system ("BIOS") sequences for the operation of peripheral devices attached to computer 13.

Fixed disk 95 is one example of a computer-readable medium that stores program instruction sequences executable by central processing unit ("CPU") 86 so as to constitute operating system 98, keyboard interface driver 99 for driving keyboard interface 88, mouse interface driver 100 for driving mouse interface 89, floppy disk interface driver 101 for driving floppy disk interface 90, display interface driver 102 for driving display interface 91, network interface driver 104 for driving network interface 96, network management application 103, and other files 105. As mentioned above, operating system 98 is preferably a windowing operating system, such as Windows 2000, Windows 98, Windows 95, and Windows NT, although other types of operating systems such as DOS, UNIX and LINUX may be used with the present invention. Network management application 103 is an application for execution in CPU 86 to allow a user of computer 13 to access, view and modify network settings of the network devices on network 10. For example, network management application 103 may operate in conjunction with one of functional application modules 31 which acts as a network management proxy to exchange data between network devices on network 10 and network management application 103.

The architecture of the present invention provides functional support for such network applications on behalf of those network devices that do not have the embedded capability to provide such support. Other files 105 contain other information and programs necessary for computer 13 to operate and to add additional functionality to computer 13.

Figure 5C:
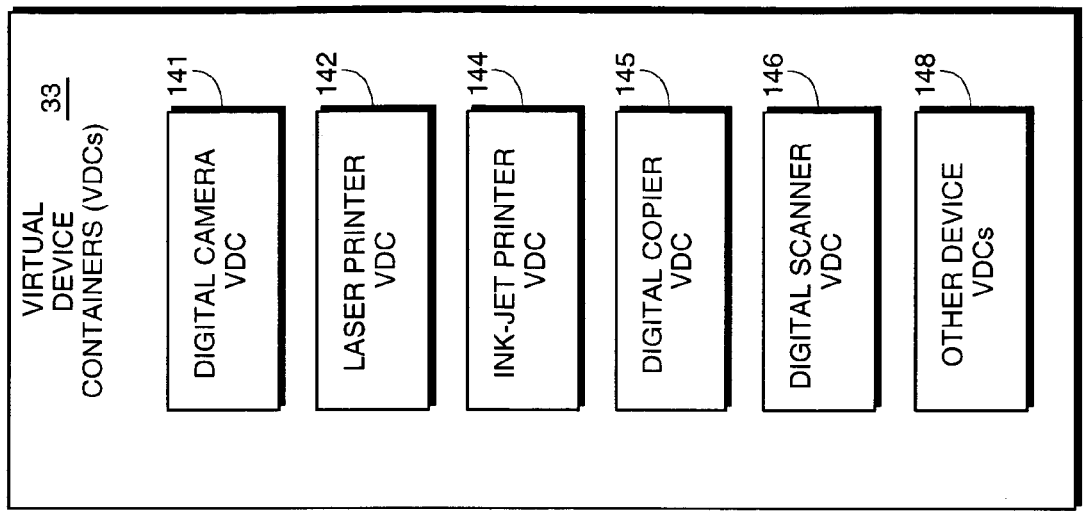
FIGS. 5A, 5B and 5C are detailed block diagrams for explaining functional application modules, functional component modules and virtual device containers according to one embodiment of the present invention.
Figure 5B:
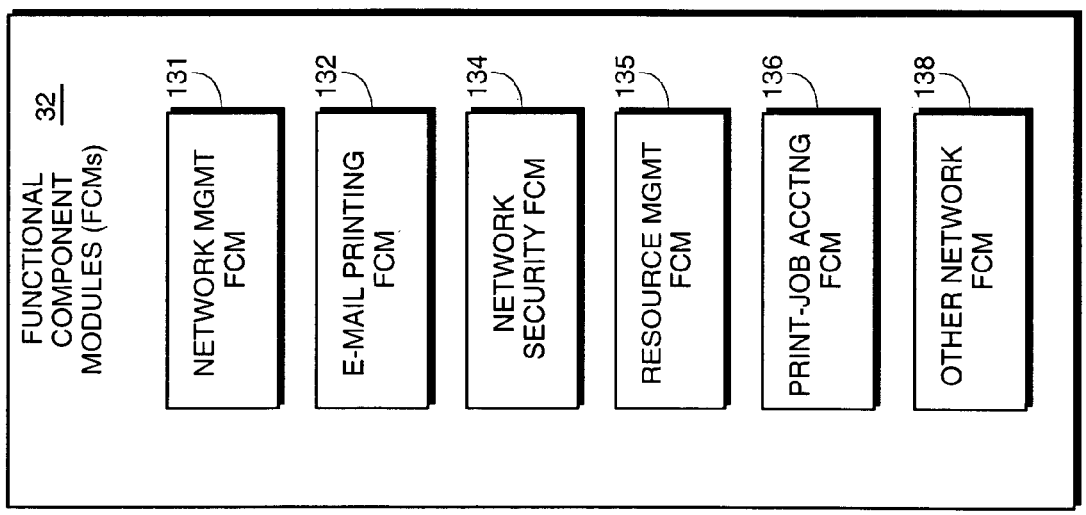
Figure 5A:
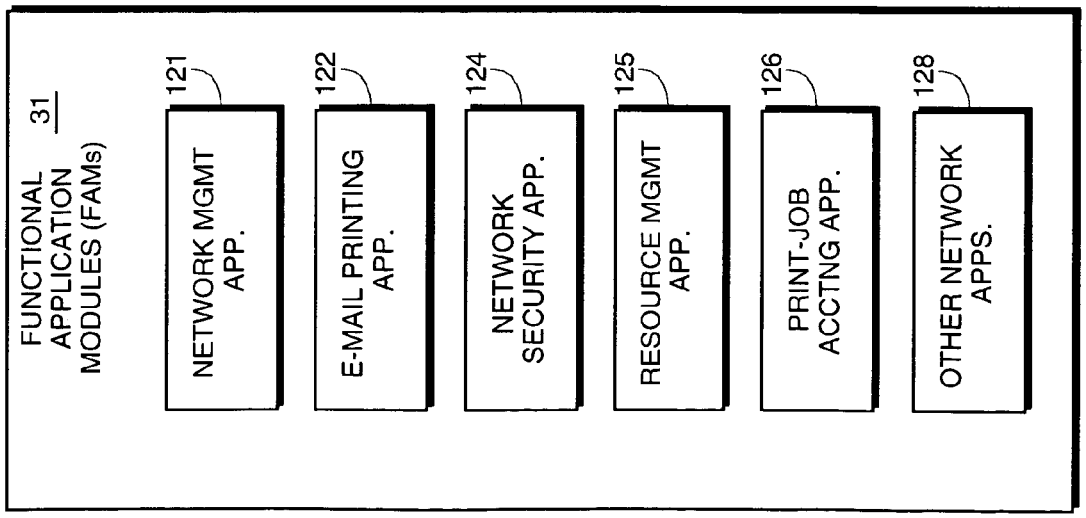

FIGS. 5A, 5B and 5C provide detailed descriptions of functional application modules (FAMS) 31, functional component modules (FCMs) 32 and virtual device containers (VDCs) 33. As seen in FIG. 5A, FCMs 31 contain different network-based applications which rely upon data and/or functionality from various network devices on network 10, or which control the various network devices on network 10 in some fashion. FAMs 31 include network management application 121, e-mail printing application 122, network security application 124, resource management application 125, print job accounting application 126, and other network applications 128. Network management application 121 is a network-based application which is executed in server 11 to provide functionality for managing various network devices on network 10. For example, a user, such as a network administrator, may utilize network management application 103 on computer 13 to access the functional capabilities provided by network management application 121 in server 11, thereby allowing the user to reconfigure network settings of one or more of the network devices on network 10, such as network printer 15.

E-mail printing application 122 provides the functional capability for users, such as a user of computer 13, to send a print job via e-mail printing application 122 to a printer, such as printer 17 or digital copier 14, for printing. Network security application 124 provides network-wide functional capability to ensure secure transmission of data between network devices on network 10 and to prevent undesired access to any one of the network devices. Resource management application 125 provides network-wide functional capability to manage resources, such as printers 15, 17 and 18, so that they are utilized in the most efficient manner to accomplish the tasks submitted by users of network 10. Print job accounting application 126 provides network-wide capability to monitor and track print jobs to each of the printing devices on network 10, such as printers 15, 17 and 18, and digital copier 14. In this manner, print job accounting application 126 can summarize printer usage for accounting and cost analysis purposes. Other network applications 128 provides other network-based application capability through server 11 to the users of network 10.

Turning to FIG. 5B, it can be seen that corresponding FCMs 32 exist for each of respective FAMs 31 in FIG. 5A. Accordingly, FCMs 32 include network management FCM 131, e-mail printing FCM 132, network security FCM 134, resource management FCM 135, print job accounting FCM 136 and other network FCMs 138. Each of the foregoing FCMs is used to provide support on behalf of a given network device, such as network printer 15, for each of the corresponding FAMs 31 of FIG. 5A. In this manner, an FCM, such as network management FCM 131, can be executed in server 11 to provide support to network management application 121 on behalf of a network device, such as network printer 15. In this manner, users of network management application 121 are provided with the external appearance that network printer 15 has embedded support for network management application 121. It can be appreciated that network management FCM 131 acts as a kind of embedded-function proxy for the network device to which it corresponds. Accordingly, a legacy device such, as network printer 15, which does not have embedded support for a particular network-based application can virtually extend its functionality through a set of modularized software components. The software components are executed in a server on the same network that the legacy network device resides, thereby providing the needed software functionality on behalf of the legacy network device as if such functionality were embedded in the legacy network device.

Therefore, selected ones of FAMs 31 and FCMs 32 can be implemented in a server in order to accommodate the needs of the particular legacy devices on the network to implement the desired network-based applications across the network. The manner in which FAMs 31 and FCMs 32 are implemented and interfaced to provide such support is discussed in more detail below.

Turning to FIG. 5C, virtual device containers 33 are seen to include digital camera VDC 141, laser printer VDC 142, ink jet printer VDC 144, digital copier VDC 145, digital scanner VDC 146, and other device VDCs 148. As discussed above, FCMs 32 are utilized to virtually expand the functional capabilities of a given network device which does not have the desired functionality embedded therein. Accordingly, it can be appreciated that the specific selection of FCMs 32 to provide the necessary functional extensions for a given network device, such as network printer 15, depends on the functional capability that is already embedded in network printer 15, and also depends on the FAMs 31 that the network device needs to support.

For example, network printer 15 already has embedded capability for e-mail printing by means of network e-mail server module 74 in printer memory 64. Accordingly, network printer 15 does not need to have a functional extension in order to support e-mail printing application 122. However, network printer 15 is not seen to have embedded support for any of the other FAMs 31 shown in FIG. 5A. Accordingly, it is desirable to implement network management FCM 131, network security FCM 134, resource management FCM 135, and print job accounting FCM 136 to provide functional support on behalf of network printer 15 to corresponding FAMs 121, 124, 125 and 126. It can be appreciated, therefore, that different combinations of functional component modules 32 will be desired for each particular network device on network 10 in order to provide all such network devices with full capability to support all of the functional application modules 31, depending on the different levels of functionality already embedded in each of the network devices.

In view of the above, a mechanism is necessary to coordinate the desired collection of FCMs 32 corresponding to each network device on network 10. Each of virtual device containers 33 provide this mechanism by acting as a virtual container to contain the necessary extended functional support for a given network device. Each VDC presents a virtual device to external entities on the network with an appearance of the same level of functionality and consistent external interface, regardless of the level of functional support that is embedded in the actual device. Accordingly, the functional capabilities of an existing network device can be virtually extended without changing the hardware of the network device.

To accomplish this, each VDC contains the necessary set of FCMs 32, when used in combination with the already embedded functionality of the corresponding network device, and can support the FCMs which are implemented in a server on the same network as the network device. It can therefore be appreciated that the VDC's main purpose is to provide a container in which the necessary FCMs execute. In particular, the VDC is responsible for loading each of the FCMs necessary for the corresponding network device, and for providing an external interface for network users of the VDC to find and to interoperate with the FCMs contained within that particular VDC. In this regard, a separate VDC is implemented and dedicated for each particular network device on network 10 that needs its functional capabilities virtually extended through the use of a set of FCMs 32.

Accordingly, digital camera VDC 141 is provided to contain the necessary FCMs 32 in order to make up for the functional deficiencies of digital camera 12 for supporting FAMs 41. In a similar manner, laser printer VDC 142, ink jet printer VDC 144, digital copier VDC 145, and digital scanner VDC 146 provide virtually extended functional support on behalf of laser printers 17 and 18, network printer 15, digital copier 14, and digital scanner, respectively. The manner in which virtual device containers 33 are implemented in server 11 and interfaced with other components of the object-based architecture of the present invention is described in more detail below.

Figure 6:
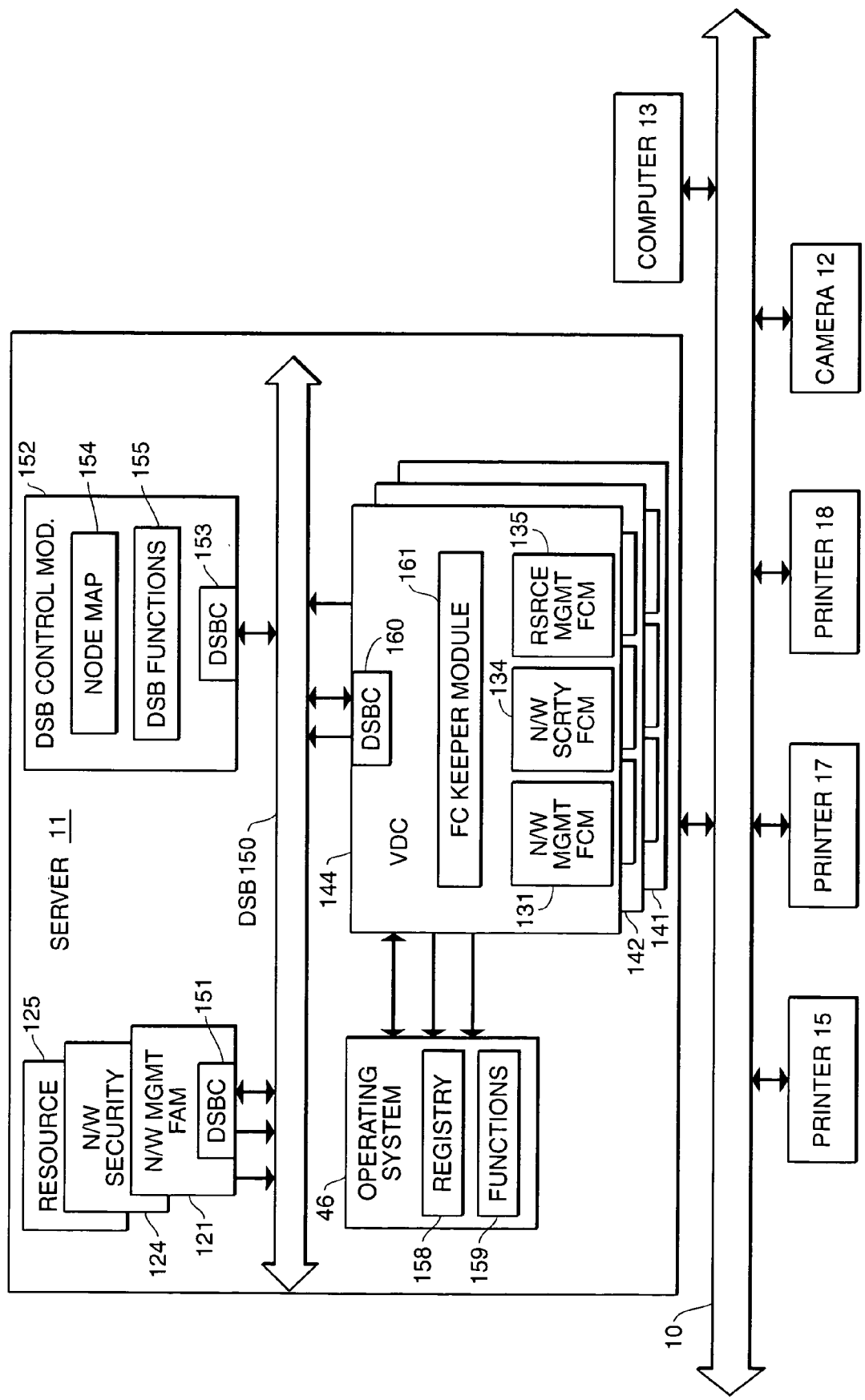
FIG. 6 is a functional block diagram for explaining an object-based architecture according to one embodiment of the present invention.

FIG. 6 provides a functional block diagram for illustrating the object-based architecture of the present invention for implementing virtual device containers 33 to virtually extend the functional capabilities of various network devices on network 10. In particular, it can be seen that server 11, printers 15, 17 and 18, digital camera 12, and computer 13 reside on network 10, as depicted in FIG. 1. In this embodiment of the present invention, virtual device containers 141, 142 and 144 are maintained and executed in server 11 in order to provide virtual functional capability for digital camera 12, laser printer 17, and network printer 15, respectively. As seen in FIG. 6, each of VDCs 141, 142 and 144 communicates via a dedicated software bus (DSB) 150 in order to communicate with other components of the illustrated architecture.

In particular, and for purposes of FIG. 6, it is presumed that only network management FAM 121, network security FAM 124, and resource management FAM 125 are desired to be implemented on network 10. In this manner, network management, network security, and resource management functions are supported by server 11 over network 10 on a network-wide basis. Accordingly, each of VDCs 141, 142 and 144 contains selected ones of FCMs 32 to provide the necessary virtual extension of functional capabilities for their respective network devices to support FAMs 121, 124 and 125. For example, if network management FAM 121 is being executed and needs information from network printer 15, network management FAM 121 establishes communication with VDC 144 which virtually represents the network management functional support capability for network printer 15 through network management FCM 131. Accordingly, each functional application module needs to find the appropriate virtual device container which corresponds to the actual network device with which the FAM needs to communicate for data exchange and functional support purposes.

Dedicated software bus (DSB) 150 is provided in order to assist FAMs 31, such as network management FAM 121, in finding the appropriate VDC corresponding to a particular network device, such as VDC 144. This allows FAMs 31 to access the corresponding FCM within the VDC so as to obtain the needed functional support on behalf of the network device. In this manner, dedicated software bus 150 provides a virtual bus through a set of APIs (application program interfaces) in order to assist the various nodes on DSB 150 to find each other and to communicate with each other to exchange data and/or commands. A node is defined as any entity which connects to and utilizes DSB 150. For example, each of functional application modules 121, 124 and 125 and each of VDCs 141, 142 and 144 are considered to be separate nodes on DSB 150. DSB 150 is implemented by tracking the presence of each node on DSB 150, facilitating protocol handshaking between the various nodes, and supporting communication between the various nodes. Each node entity connects to DSB 150 through a dedicated software bus connector (DSBC) module which is an in-process software module that is executed by the particular node entity, such as a FAM or FCM.

Each dedicated software bus connector (DSBC) provides a set of APIs for its host entity to utilize in order to communicate via DSB 150. It can be seen in FIG. 6 that network management FAM 121 has DSBC 151, VDC 144 has DSBC 160, and DSB control module 162 has DSBC 153. DSB 150 is implemented and controlled by DSB control module 162. In general, DSB control module 162 serves the purpose of maintaining node map 164 which collects information from each node on DSB 150 that is detected by DSB control module 152. Such information includes, but is not limited to, a description of each entity connected as a node on DSB 150 along with the corresponding node address of each node. For example, each of FAMs 121, 124 and 125 and each of VDCs 141, 142 and 144 are registered as DSB nodes in node map 154. DSB functions 155 handles each of the functions of DSB 150 which are implemented and controlled by DSB control module 152. Node map 154 and DSB functions 155 of DSB control module 152 will be discussed in more detail below.

As can be seen in FIG. 6, each of VDCs 141, 142 and 144 contains several modules in order to provide the extended functional capabilities required for the network device corresponding to the VDC. For example, VDC 144 corresponds to network printer 15 and includes FCMs 131, 134 and 135 for supporting network management, network security, and resource management capabilities, respectively, of corresponding FAMs 121, 124 and 125 on behalf of network printer 15. Functional component keeper module 161 is provided in VDC 144 in order to load and start each of network management FCM 131, network security FCM 134, and resource management FCM 135 at initialization of VDC 144, such as at power-up of server 11 or in response to a reset command. In particular, FC keeper module 161 reads operating system registry 168 in order to determine which ones of FCMs 32 should be loaded into VDC 144 in order to provide the desired extended functional capabilities on behalf of network printer 15. As previously mentioned, VDC 144 includes DSBC 160 in order to allow VDC 144 to communicate with other entities via DSB 150. In particular, DSBC 160 assists an external entity, such as network management FAM 121, to access and utilize the appropriate one of FCMs 131, 134 and 135 in VDC 144, such as network management FCM 131.

Virtual device containers 141, 142 and 144 therefore provide a virtual representation of digital camera 12, laser printer 17 and network printer 15 to functional application modules 121, 124 and 125, as if digital camera 12, network printer 15 and laser printer 17 contained embedded functional capability to support the aforementioned application modules. Accordingly, it can be appreciated that each functional application module, such as network FAM 121, has a one-too-many relationship with a plurality of VDCs in order to carry out the functionality of the particular FAM, such as network management capabilities.

In this regard, the corresponding FCM in each VDC has the same external interface to the FAM so that the FAM can communicate and interact with each FCM in each of the VDCs in the same consistent and uniform manner. For example, each of VDCs 141, 142 and 144 contains a separate instance of network management FCM 131 in order to allow each VDC to functionally support network management FAM 121. Accordingly, network management FAM 121 and network management FCM 131 have corresponding external interfaces to support communication and functionality between network management FAM 121 and network management FCM 131, regardless of which VDC network management FCM 131 resides in. Therefore, it can be appreciated that functional component modules 32 provide uniform functional building blocks for supporting corresponding functional application modules 31. In addition, VDCs 33 provide virtual containers in which to place selected instances of functional component modules 32 that are necessary to extend the functional capabilities of corresponding network devices to support those functional application modules 31 which have been selected and implemented on network 10. In this manner, the object-based architecture of the present invention is implemented via modular components in order to provide flexibility, depending on the types of network devices that are on a given network and depending on the types of functional, network-wide applications that are desired on the network.

Each FCM that is loaded into a VDC provides the VDC with an interface pointer that can be used to access the particular FCM. In the embodiment depicted in FIG. 6, network management FCM 131, network security FCM 134 and resource management FCM 135 are each queried by FC keeper module 161 after being loaded to return a common interface pointer. Each of the aforementioned FCMs returns its respective common interface pointer to FC keeper module 161 which in turn gives the pointers to VDC 144 in order to allow VDC 144 to subsequently access each of the aforementioned FCMs. In addition, the common interface pointers are used by VDC 144 to allow external entities, such as network management FAM 121, to access the FCMs in VDC 144. Each VDC also utilizes a set of APIs in order to communicate with each of the FCMs in the VDC. For example, VDC 144 utilizes a set of APIs to control each of FCMs 131, 134 and 135. Such APIs may be used by VDC 144 in order to direct one of the FCMs, such as network management FCM 131, to start up, shut down, pause, resume, reset and pass messages. In this manner, each VDC provides control over the operation of the FCMs contained in that particular VDC.

As discussed above, DSBC 160 in VDC 144 allows VDC 144 to assist another entity, such as network management FAM 121, to find and communicate with the appropriate corresponding FCM, such as network management FCM 131. In this manner, VDC 144 utilizes the common interface pointer which was returned from network management FCM 131 to facilitate communication between network management FAM 121 and network management FCM 131. In addition, as previously mentioned, the uniform and consistent external interface of network management FCM 131 allows network management FAM 121 to know how to communicate with network management FCM 131, regardless of the VDC network management in which FCM 131 is running.

Figure 7:
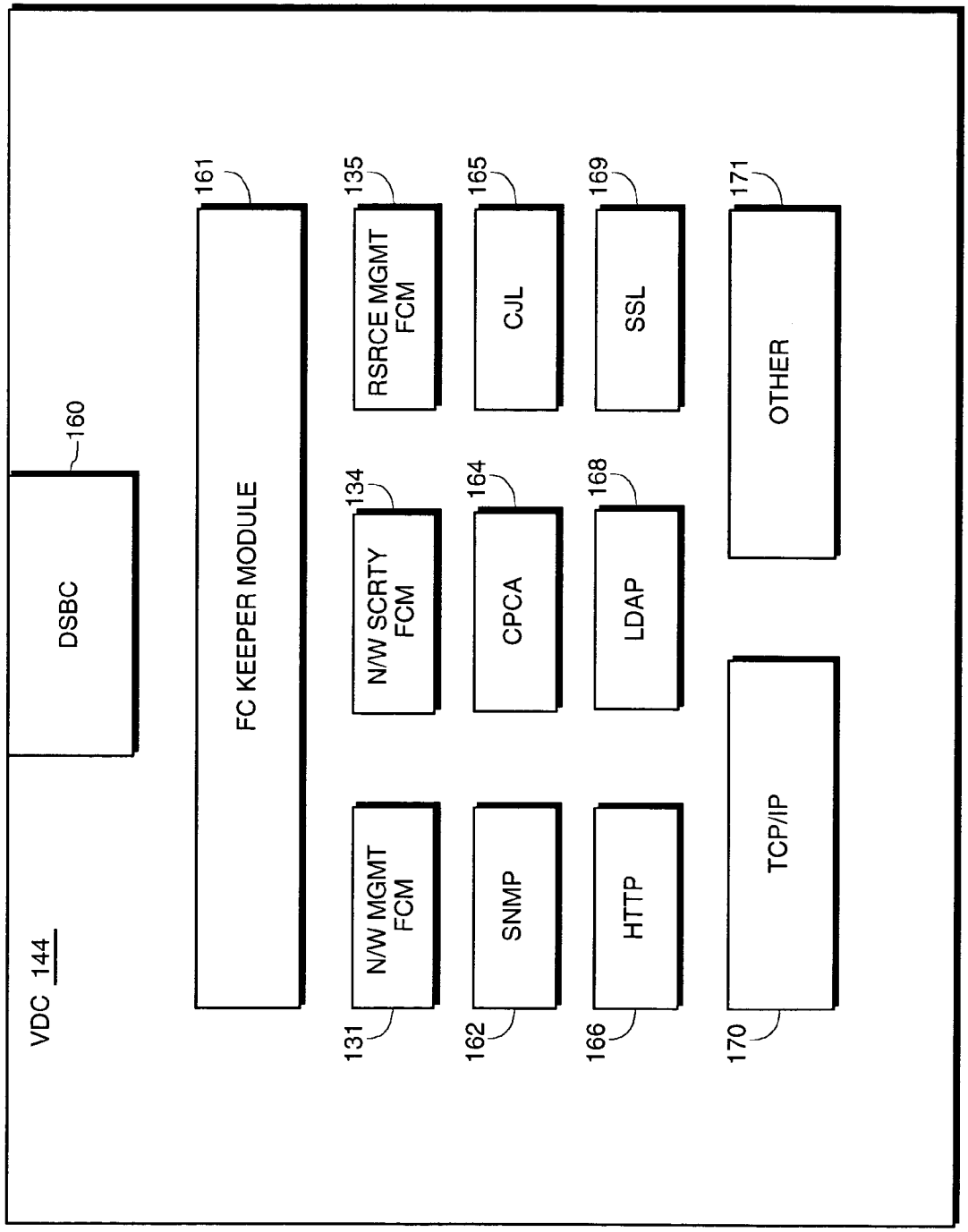
FIG. 7 is a block diagram for providing a detailed explanation of a virtual device container according to one embodiment of the invention.

FIG. 7 provides a detailed view of VDC 144 as a representative example of one of VDCs 33. As mentioned above, VDC 144 contains dedicated software bus connector (DSBC) 160 in order to connect VDC 144 to DSB 150 for communication with other entities on DSB 150. Also as previously mentioned, FC keeper module 161 is utilized to load the appropriate ones of FCMs 32 into VDC 144 when VDC 144 is started. In this respect, VDC 144 accesses a registry entry in registry 158 of operating system 46, wherein the registry entry corresponds to VDC 144. VDC 144 then loads each FCM identified in the registry entry corresponding to VDC 144. Next, VDC 144 starts network management FCM 131, network security FCM 134 and resource management FCM 135, and queries each of the aforementioned FCMs for its common interface pointer. FC keeper module 161 then passes the received common interface pointers to VDC 144 for subsequent use by VDC 144 and by other entities. In this regard, when another entity, such as network management FAM 121, wants to access network management capability of network printer 15, network management FAM 121 queries VDC 144 for interface information to network management FCM 131. VDC 144 then returns the common interface pointer to network management FAM 121 to support a subsequent interface between network management FAM 121 and network management FCM 131. In this manner, it can be appreciated that the VDC registry entries in registry 158 control the internal architecture of each corresponding VDC.

Therefore, a user of operating system 46, such as a network administrator, can edit VDC entries in registry 158 in order to provide the number of VDCs necessary to support the network devices on network 10 and in order to indicate, in each VDC registry entry, the FCMs which each VDC needs to load in order to provide the extended functional support necessary for the corresponding network device.

Returning to FIG. 7, it can be seen that FC keeper module 161 has loaded network management FCM 131, network security FCM 134 and resource management FCM 135. In addition, FC keeper module 161 has loaded appropriate protocols which are necessary for each of the foregoing FCMs to communicate with external entities, such as network printer 15, which VDC 144 represents, and with corresponding FAMs 121, 124 and 125. For example, network management FCM 131 may be instructed by network management FAM 121 to change the IP address of network printer 15. Accordingly, network management FCM 131 needs to communicate the change of the IP address to network printer 15 over network 10. If network printer 15 only supports network management functions by using SNMP, then network management FCM 131 must issue the command to change the IP address in SNMP by using SNMP protocol module 162. In addition to SNMP protocol 162, VDC 144 also includes CPCA module 164, CJL 165, HTTP module 166, LDAP module 168, SSL module 169 and TCP/IP module 170 in order to provide support for their respective protocols to each of FCMs 131, 134 and 135 of VDC 144. Other module 171 is also provided to support other protocols and functionality to support FCMs 131, 134 and 135.

Figure 8:
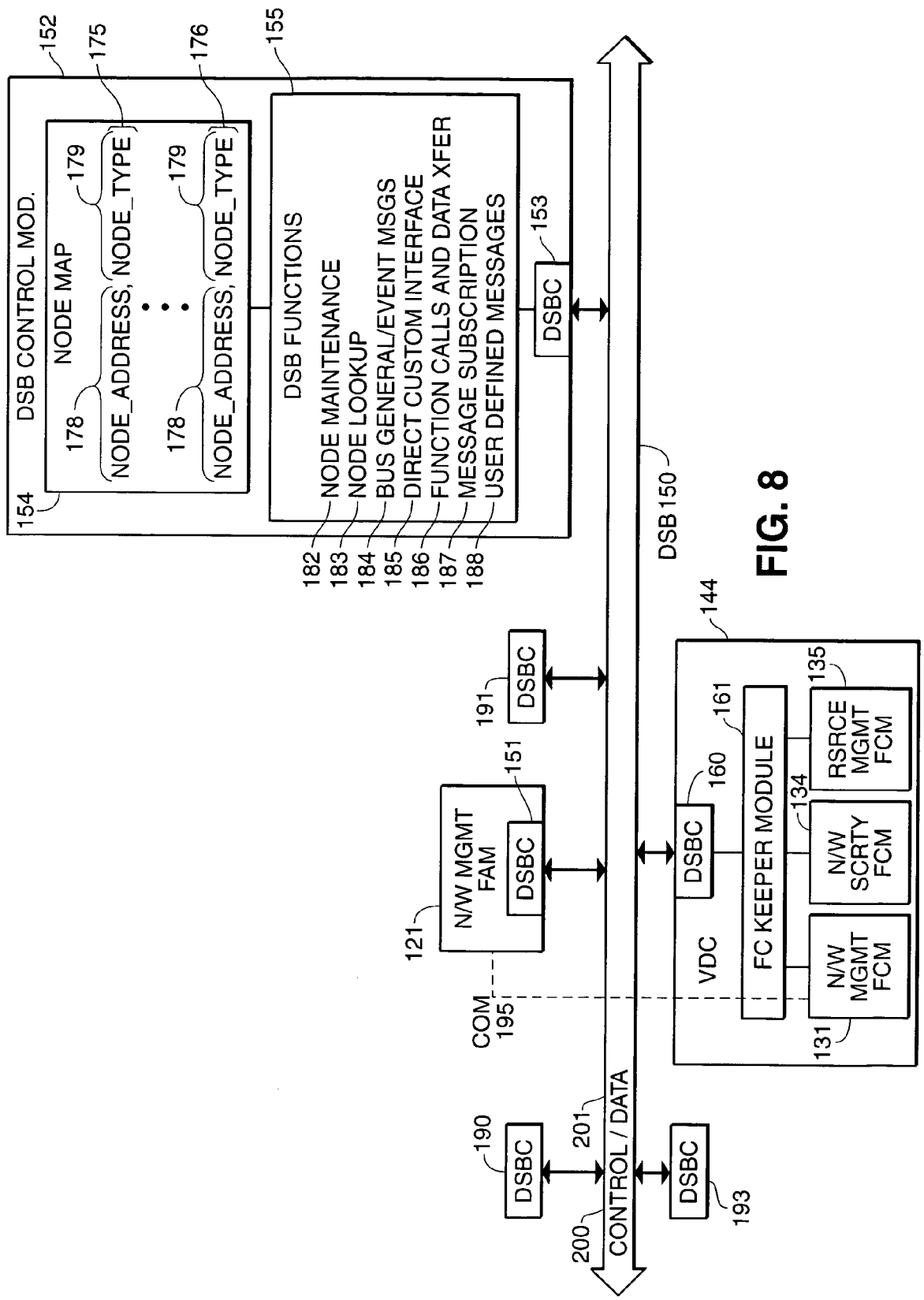
FIG. 8 is a block diagram for providing a detailed explanation of a dedicated software bus according to one embodiment of the invention.

FIG. 8 is a block diagram to depict the communication services provided by dedicated software bus (DSB) 150 in order to facilitate communication between FAMs 31 and FCMs 32 of each of VDCs 33. Specifically, DSB control module 152 is provided to implement and control communication via DSB 150 between the various nodes on DSB 150. To facilitate this implementation, DSB control module 152 includes node map 154 and DSP functions 155 which are made accessible and which communicate through DSBC 153 via DSB 150. Node map 154 is utilized to contain node entries for each node on DSB 150 so that DSB control module 152 is aware of all nodes operating on DSB 150 and so that other nodes can find each other. Accordingly, each node entry in node map 154 contains a unique node address 178 to the corresponding node and contains a node type 179 which provides a brief description of the corresponding node. Each of the node entries is entered into node map 154 when DSB control module 152 becomes aware of the presence of that particular node on DSB 150.

In this regard, when each node is activated, such as startup of the particular entity (e.g., network management FAM 121), the DSBC of that entity sends an announcement message over DSB 150. DSB control module 152 responds to this announcement message with a connect message to inform the corresponding DSBC that it is now connected as a node to DSB 150. Node map 154 is thereby updated to reflect the presence of the node on DSB 150. For example, when network management FAM 121 is started in server 11, DSBC 151 sends an announcement message using an API over DSB 150. DSB control module 152 responds with a connect message to DSBC 151, and enters node entry 175 with node address 178 corresponding to DSBC 151 and node type 179, which describes that node entry 175 corresponds to network management FAM 121. In this manner, each node represented by DSBCs 151, 160, 190, 191 and 193 is recognized by DSB control module 152 and corresponding node entries are entered into node map 154. When a particular node wishes to disconnect from DSB 150, the node issues a disconnect message over DSB 150 to DSB control module 152, which then updates node map 154 to remove the corresponding node entry for that particular node and which responds with a detach message to the corresponding bus node to inform it that it has been disconnected from DSB 150.

DSB functions 155 is provided to implement and control communication over DSB 150 between the various nodes by utilizing bus messages (APIs) which are channeled through DSB control module 152. It can therefore be appreciated that DSB control module 152 acts as a central arbiter of all bus messages on DSB 150. In addition, DSB control module 152 can act as a port for a bus message to a node on another dedicated software bus on another network system, such as on another server. This cross-platform embodiment of the present invention will be discussed in more detail below.

As can be seen in FIG. 8, DSB functions 155 includes a plurality of functions which include node maintenance 182, node lookup 183, bus general/event messages 184, direct custom interface 185, function calls and data transfer 186, message subscription 187 and user-defined messages 188. Node maintenance 182 supports bus messages over DSB 150 to instruct maintenance, such as connect, disconnect, startup and shutdown, of a particular node. Therefore, node maintenance 182 is used to facilitate acknowledging the presence or absence of a particular node and updating node map 154 accordingly. Node lookup 183 supports bus messages to and from a particular node for finding a specific node on DSB 150. Bus general/event messages 184 is utilized to support bus messages over DSB 150 for supporting general bus-wide messages and event messages, such as time of day messages, presence-related messages, reset, shutdown, pause and resume messages.

In this manner, bus/general event messages 184 provides a certain amount of control over all modes on DSB 150 by DSB control module 152. Direct custom interface 185 supports bus messages between two nodes on DSB 150 so as to negotiate a direct custom interface between the two nodes for subsequent communication between the two nodes without having to utilize DSB 150. Function calls and data transfer 186 supports bus messages over DSB 150 for calling functions of a particular node by another node and for transferring data between two nodes. Message subscription 187 is utilized in order to allow a particular node to subscribe for subsequent receipt notification by DSB control module 152 when bus messages of a certain type and/or for a certain node are detected on DSB 150. User-defined messages 188 support the transfer of messages over DSB 150 which are defined by a particular node (or nodes) which only has meaning to that particular node.

Node lookup 183 is utilized in order to allow a particular node on DSB 150 to find and communicate with another node on DSB 150. For example, network management FAM 121 finds and communicates with network management FCM 131 within VDC 144 by first finding the presence of VDC 144 on DSB 150 and then obtaining an address to VDC 144. First, DSBC 151 of network management FAM 121 sends a node lookup message over DSB 150 to DSB control module 152. Node lookup 183 of DSB functions 155 processes the node lookup message and queries node map 154 for a node entry corresponding to the node type 179 provided by DSBC 151. For example, the node lookup message may contain an indicator that network management FAM 121 wishes to find the VDC corresponding to network printer 15.

Accordingly, the node lookup message may contain an identifier corresponding to network printer 15. Node map 154 is then interrogated to find a node entry having node type 179 which has the identifier for the VDC corresponding to network printer 15. If such a node entry cannot be found, an error is returned to DSBC 151. If the corresponding node entry is found, such as node entry 175, corresponding node address 178 is sent back to DSBC 151. Network management FAM 121 can now send bus messages over DSB 150 through DSB control module 152 that are addressed to DSBC 150, which is the node for VDC 144. In this manner, DSB control module 152 implements DSB 150 for having control channel 200 and data channel 201.

Control channel 200 is utilized for messages over DSB 150 regarding finding and establishing communication between two nodes on DSB 150. Data channel 201 is used once two nodes on DSB. 150 have established communication for transferring data between the two nodes and/or for requesting functions of one of the nodes by another. For example, once network management FAM 121 has obtained corresponding node address 178 for DSBC 160 of VDC 144, network management FAM 121 can send function calls and data transfer messages to VDC 144. In particular, network management FAM 121 needs the services of network management FCM 131 in VDC 144 and therefore sends a data transfer message to VDC 144 over DSB 150 requesting the common interface pointer of network management FCM 131. Once network management FAM 121 has obtained the common interface pointer, network management FAM 121 can then send function calls and data transfer messages over DSB 150 directed to network management FCM 131 through DSBCs 151 and 160, respectively.

In this manner, network management FAM 121 can obtain the needed support from each corresponding network management FCM 131 in the various VDCs on DSB 150 in order to achieve the virtually-extended network management support of each of the network devices on network 10 corresponding to the VDCs.

It can be appreciated that, once all of the nodes on DSB 150 have found each other and are engaged in communication between each other via function calls and data transfer messages, the volume of bus messages over DSB 150 can become quite heavy. For this reason, it is desirable to enable a given pair of nodes, such as network management FAM 121 and network management FCM 131, to establish a direct custom interface for communicating with each other once they have found each other, without the need for using bus messages over DSB 150. Therefore, direct custom interface 185 supports negotiation between two nodes via bus messages over DSB 150 to agree on a common mechanism for establishing a direct custom interface between the two nodes. For example, once network management FAM 121 has obtained a globally unique I.D. (GUID) of VDC 144 and the common interface pointer of network management FCM 131 via DSB 150, network management FAM 121 can then send direct custom interface negotiation messages over DSB 150 to network management FCM 131. The two nodes can then agree on a conventional software interface standard for setting up a direct custom interface between them.

As shown in FIG. 8, network management FAM 121 and network management FCM 131 have agreed on the COM standard supported by functions 159 of operating system 46 in server 11. Therefore, once negotiation of the agreed-upon standard is completed, network management FAM 121 establishes direct custom interface via COM 195 to network management FCM 131. From there on, network management FAM 121 and network management FCM 131 can conduct function calls and data transfer via COM 195 without burdening DSB 150 with excessive bus message traffic. It should be noted that COM 195 is only one example of a type of direct custom interface that can be established between two nodes on DSB 150 via direct custom interface 185. For example, the two nodes can establish a direct custom interface based on any other conventional software interface standard supported in functions 159 of operating system 46. Other conventional software interface mechanisms include, but are not limited to, DCOM, HTTP, mail slot, SOAP, XML, sockets, MSMQ, JINI/JAVA, and IFTP. In this manner, two nodes on DSB 150 can find each other and then establish the direct custom interface of their choosing which is supported by the operating system in which the two nodes reside. It should be noted that data channel 201 of DSB 150 can also be used to facilitate function calls and data transfer between two nodes on DSB 150. However, such use of data channel 201 may result in excessive bus message traffic on DSB 150, as described above.

Message subscription 187 provides subscription services to the nodes on DSB 150 for subsequent notification to a subscriber that a particular type of bus message has been detected by DSB control module 152 on DSB 150. For example, DSBC 190 on DSB 150 may represent an entity, such as resource management FAM 125, which needs to know when resource management capability is present for a particular network device, such as network printer 15. Accordingly, DSBC 190 can utilize message subscription 187 to subscribe for subsequent notification when connect and/or disconnect bus messages are detected on DSB 150 containing node address 178 for DSBC 160. In this manner, DSBC 190 can track when DSBC 160 of VDC 144 is present on DSB 150. In addition, the subscription may be directed to being notified whenever a particular type of bus message from a particular node is detected on DSB 150. For example, DSBC 190 can be notified whenever a "status update" message is sent from DSBC 160 on behalf of network management FCM 131 over DSB 150. In this manner, message subscription 187 allows other nodes to automatically be kept apprized of activity of certain other nodes on DSB 150.

Figure 9:
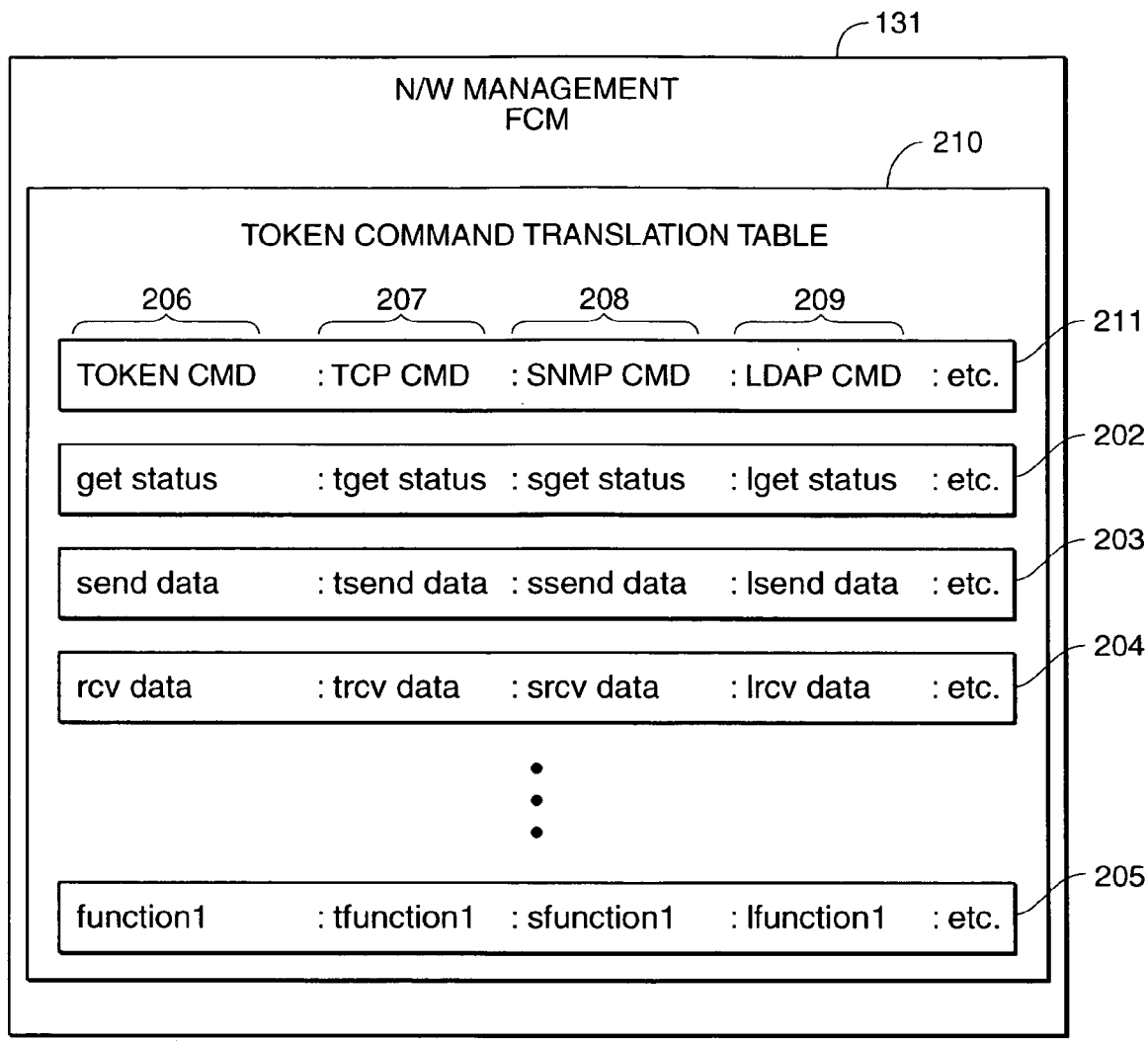
FIG. 9 is a block diagram for providing a detailed explanation of a token command translation table according to one embodiment of the invention.

FIG. 9 provides a detailed block diagram of network management FCM 131 containing token command translation table 210. As discussed with regard to FIG. 7, VDC 144 represents network printer 15 which may only support communication for network management purposes via SNMP 162. In the alternative, network printer 15 may support several protocols for network management purposes, such as TCP and LDAP, in addition to SNMP. Accordingly, network management FCM 131 needs to have the capability to support the various possible protocols which are supported by the network device to which the VDC containing the particular FCM corresponds. For example, if network management FCM 131 receives a command from network management FAM 121 to get the status of network printer 15 to which VDC 144 corresponds, FCM 131 must send an appropriate message over network 20 to network printer 15 in a protocol that network printer 15 understands. Accordingly, each of FCMs 32 contains a command transition table to translate a command from a corresponding functional application module into a command that can be sent over network 10 to the corresponding network device. Therefore, each of FAMs 31 uses token commands to sent to corresponding FCMs 32, wherein a token command is a generic command to be carried out by the corresponding FCM, regardless of the protocol utilized between the corresponding FCM and the actual network device.

Turning to FIG. 9, token command translation table 210 provides a mechanism for converting a token command received from one of FAMs 31 into an appropriate command in a protocol supported by the network device corresponding to the VDC in which the FCM resides. As seen in FIG. 9, token command translation table 210 includes a series of token command entries 202 to 205. Header 211 describes the various entries in each token command entry. Accordingly, header 211 includes token command 206, which is the name of the token command that needs to be translated, TCP command 207, which is the corresponding command in TCP protocol, SNMP command 208, which is the corresponding command in SNMP protocol, and LDAP command 209, which is the corresponding command in LDAP protocol.

Of course, other protocols can be supported in token command translation table 210. For example, if network management FCM 131 receives a "send data" token command from network management FAM 121, token command entry 203 is utilized to translate token command of send data 206 into SNMP command 208 of "ssend data" so that the corresponding SNMP command 208 can be sent by network management FCM 131 via VDC 144 and server 11 over network 10 to network printer 15, which supports SNMP protocol. Accordingly, it can be appreciated that token command translation table 210 allows a given FCM to handle communications with its corresponding FAM in a generic manner, regardless of the protocols supported by the network device that the FCM supports.

Each entry in each token command entry of token command translation table 210 may simply be a command in the corresponding protocol, or may be the name of a file which is to be accessed and utilized to implement specific logic required by that particular protocol for the network device. For example, if network printer 15 only supports SNMP protocol and a "send data" token command is received by network management FCM 131, then network management FCM 131 will utilize "ssend data" of token command entry 203. "Ssend data" can be the name of a file which contains logic necessary for an exchange of a plurality of SNMP messages required to have network printer 15 send data to FCM 131 in the SNMP protocol. Accordingly, the various protocol segments of each token command entry in token command translation table 210 may correspond to commands in different respective protocols, and also may correspond to files containing the necessary logic to carry out the given token command 206 in the respective protocol. Token command translation table 210 therefore allows FCM 131 to use generic logic and commands when interfacing to FAM 121, without regard to the protocol capabilities of network printer 15.

Figure 10:
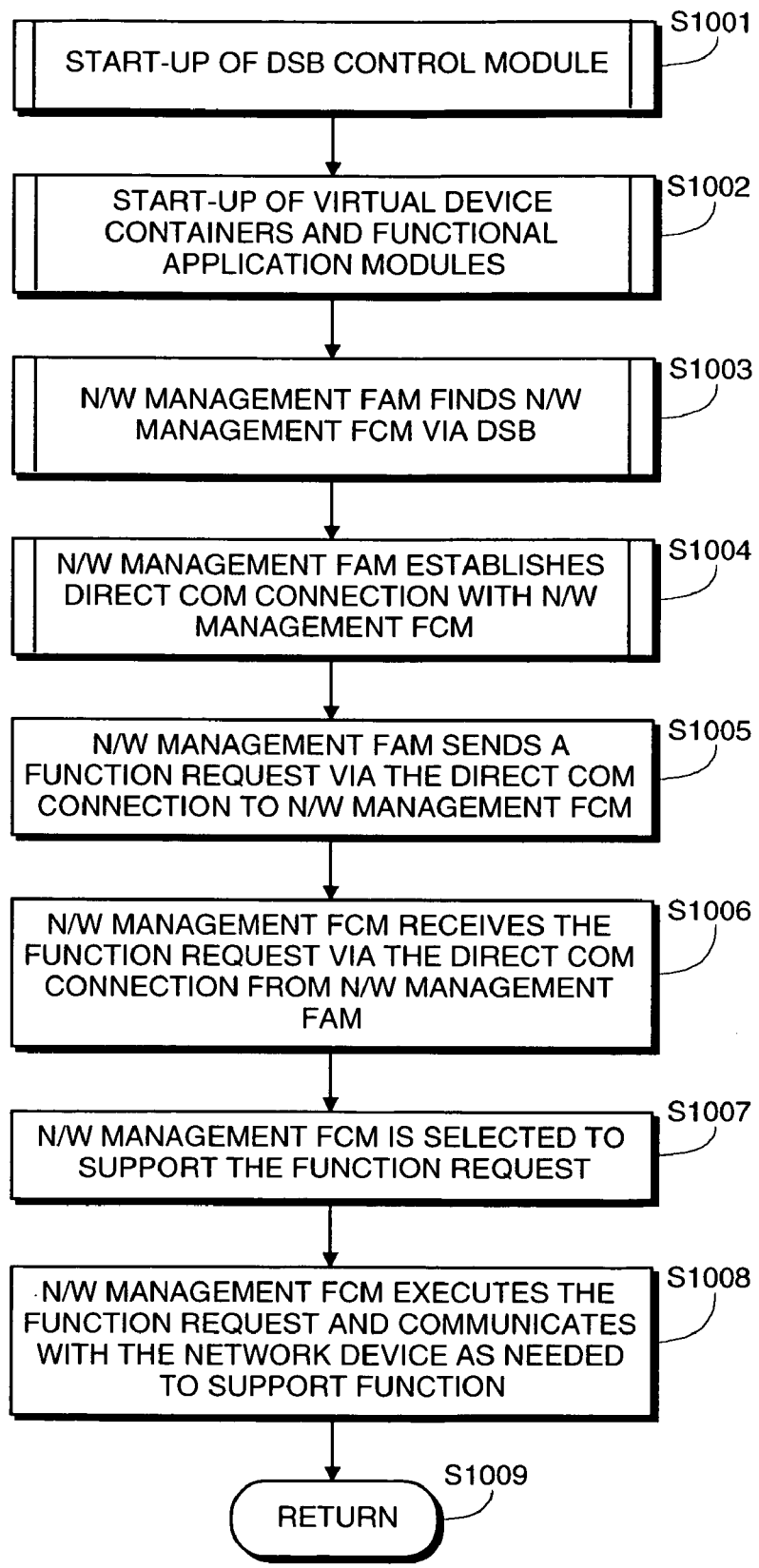
FIG. 10 is a flowchart for explaining the operation of the object-based architecture according to one embodiment of the present invention.

FIG. 10 is a flowchart for explaining the operation of the object-based architecture of the present invention. In step S1001, DSB control module 152 is loaded and started in server 11, which as previously mentioned, is performed at power-up of server 121 or upon receipt of a reset command. In this manner, DSB 150 is implemented by DSB control module 152 for supporting the various nodes of the object-based architecture of the present invention. This step is discussed in more detail in FIG. 11.

Figure 11:
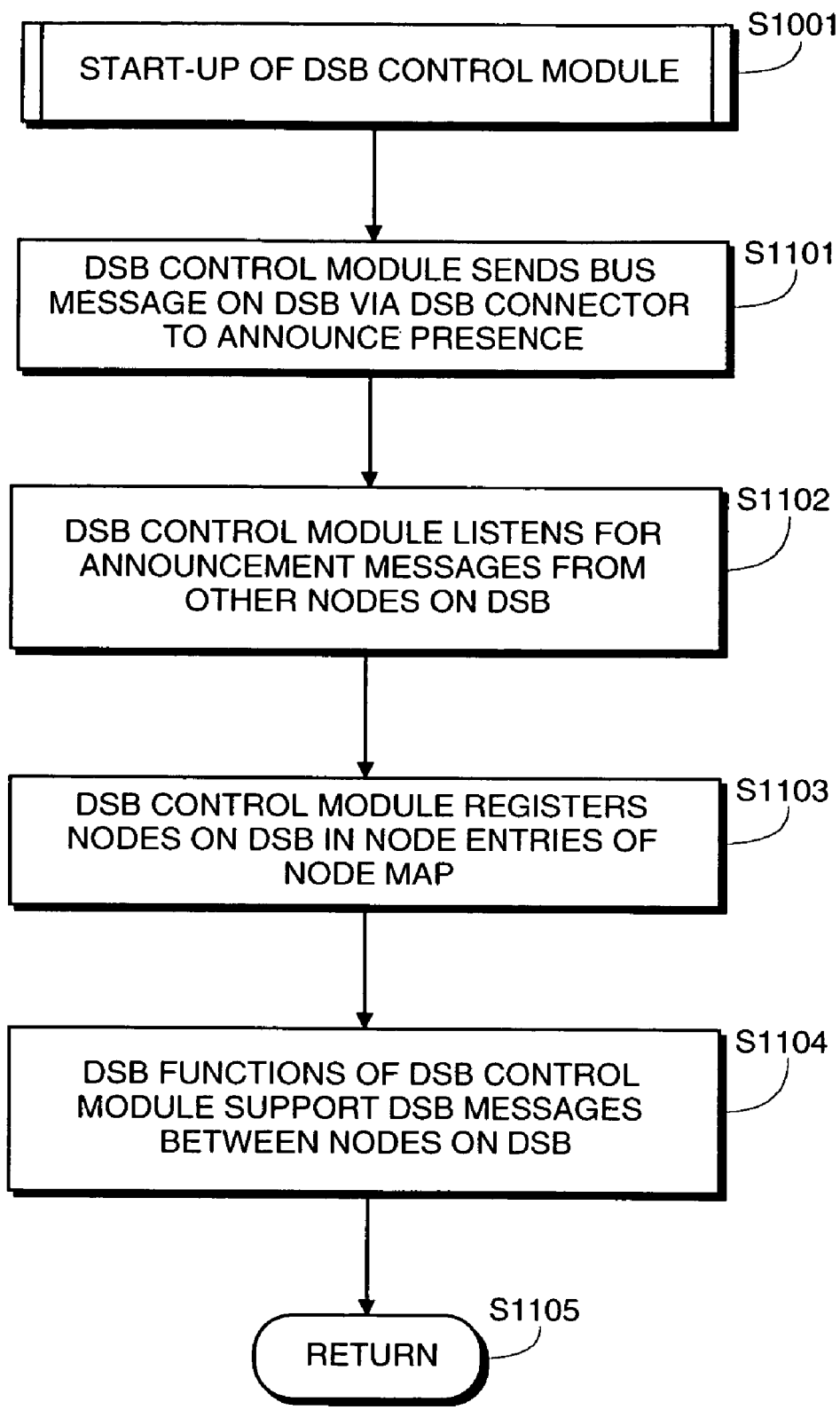
FIG. 11 is a flowchart for explaining the operation of a dedicated software bus control module according to one embodiment of the present invention.

Accordingly, turning to FIG. 11, DSB control module 152 sends a bus message on DSB 150 via DSBC 153 in order to announce the presence of the DSB control module 152 to all other nodes on DSB 150. Next, in step S1102, DSB control module 152 listens for announced messages from other nodes on DSB 150 as other nodes are started-up. In step S1103, DSB control module 152 registers node address 178 and node type descriptor 179 corresponding to each detected node on DSB 150 into a separate node entry in node map 154. DSB functions 155 then listen for and handle all DSB messages on DSB 150 by utilizing the appropriate one of functions 182 to 188 for each bus message. In this manner, each bus message is sent to the proper node on DSB 150. Flow then passes to return in step S1105.

Figure 12:
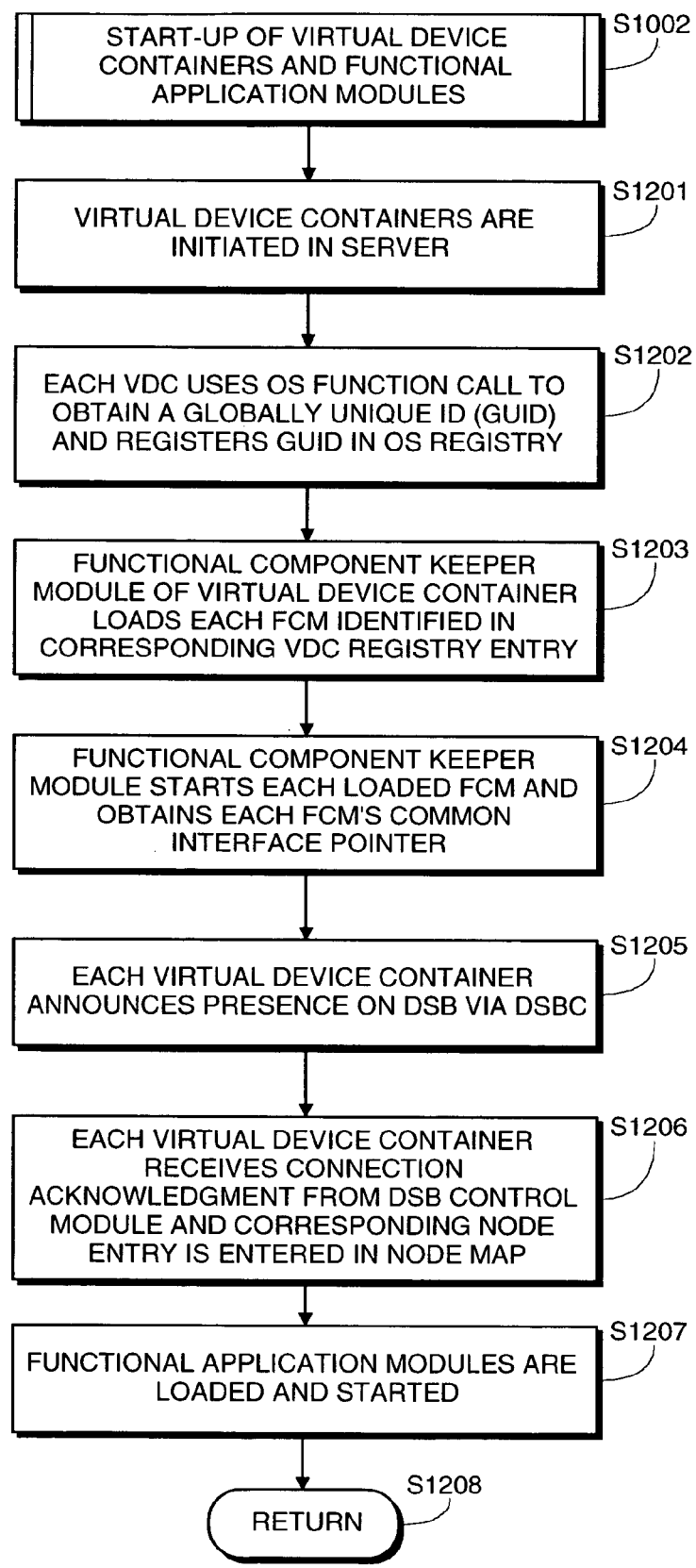
FIG. 12 is a flowchart for explaining the operation of virtual device containers and functional application modules according to one embodiment of the present invention.

Returning to FIG. 10, flow passes to step S1002 in which each of virtual device containers 33 and functional application modules 31 are started-up, preferably at power-up of server 11 or upon receipt of a reset command. Step S1002 is explained in more detail in the flowchart of FIG. 12. Accordingly, step S1201 of FIG. 12 starts by initiating each of the virtual device containers 33 in server 11. In step S1202, each VDC uses an operating system function call from OS functions 159 to obtain a globally unique identifier (GUID) and then registers the GUID in OS registry 158. The GUID is for subsequent use by another entity that wishes to establish a connection with the VDC. Next, a functional component keeper module (FC keeper module) in each VDC, such as FC keeper module 161, accesses registry 158 of operating system 46 and obtains the VDC registry entry corresponding to that particular VDC (step S1203). Each virtual device container then loads an instance of each one of FCMs 32 which is identified in the corresponding VDC registry entry (step S1203). In step S1204, functional component keeper module 161 starts each of the loaded FCMs 131, 134 and 135, which were indicated in the corresponding VDC registry entry, and sends a request to each of the FCMs for its corresponding common interface pointer. Each of FCMs 131, 134 and 135 then returns a corresponding common interface pointer to FC keeper module 161 which then passes the common interface pointers to VDC 144 for subsequent use.

Next, in step S1205, each one of virtual device containers 141, 142 and 144 announces its presence on DSB 150 with an announcement bus message via its respective DSBC, such as DSBC 160. Each VDC then receives a connection acknowledgment from DSB control module 152 to inform each VDC that it is connected on DSB 150 (step S1206). In addition, DSB control module 152 places a node entry corresponding to each VDC into node map 154 containing node address 178 and node type descriptor 179 corresponding to the particular VDC (step S1206). In step S1207, functional application modules 121, 124 and 125 are loaded and started in server 11. It should be noted that each one of functional application modules 121, 124 and 125 announces its presence on DSB 150, receives an acknowledgment from DSB control module 152, and has a corresponding node entry placed into node map 154 as described above in steps S1205 and S1206. Flow then passes to return in step S1208.

Figure 13:
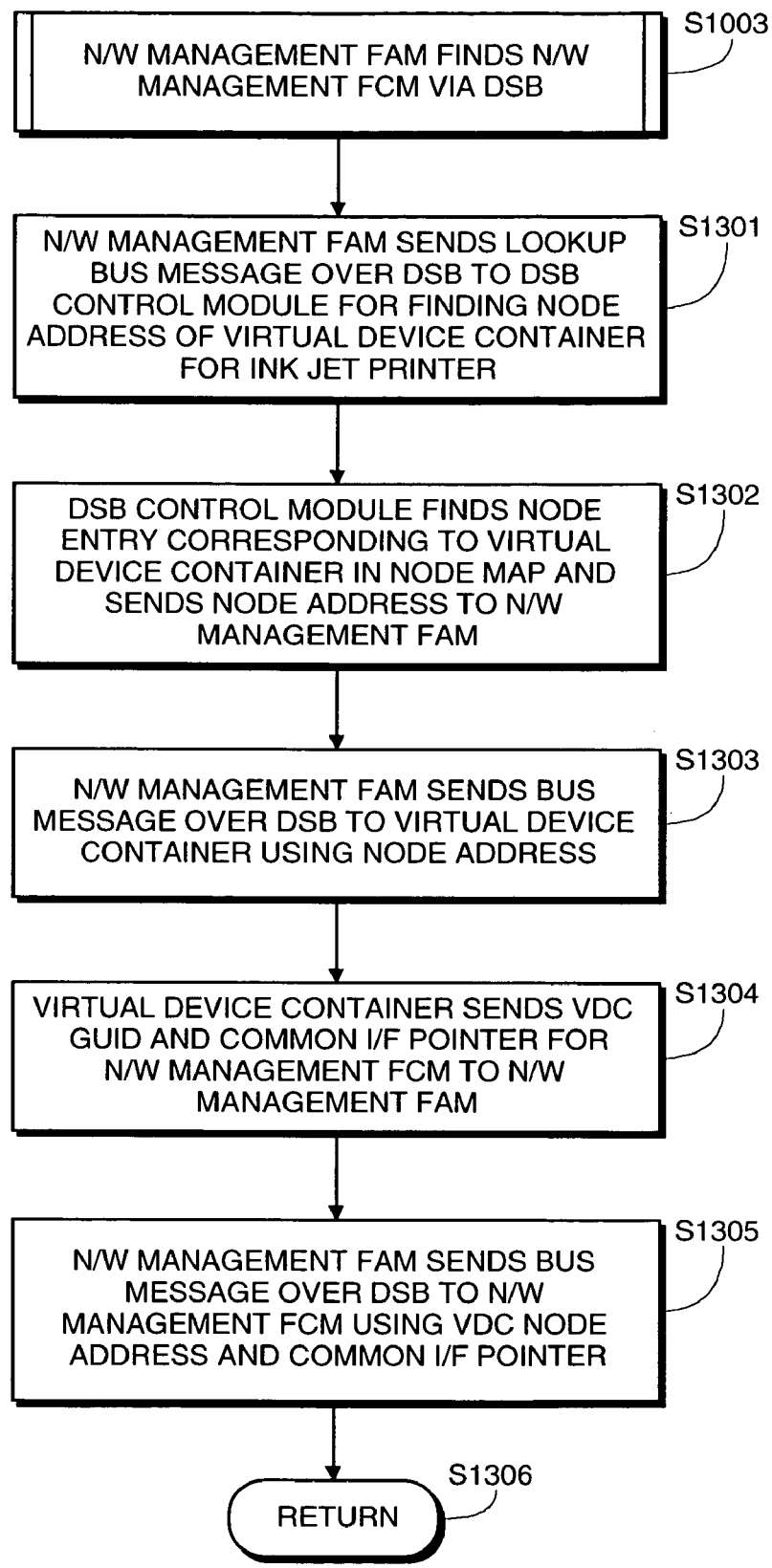
FIG. 13 is a flowchart for explaining how nodes find each other on a dedicated software bus according to one embodiment of the present invention.

Returning to FIG. 10, flow passes to step S1003 in which network management FAM 121 finds network management FCM 131 via DSB 150. Step S1003 is described in more detail in the flowchart of FIG. 13. Accordingly, turning to FIG. 13, step S1301 begins by having network management FAM 121 send a lookup bus message over DSB 150 to DSB control module 152 in order to find the node address corresponding to virtual device container 144 for network printer 15. In this respect, the lookup bus message can contain an identifier such as node type descriptor 179 which identifies network printer 15 or VDC 144. It can be appreciated that other forms of lookup bus messages can be utilized, such as a lookup bus message that simply asks DSB control module 152 for all existing nodes on DSB 150. In this manner, a functional application module, such as network management FAM 121, can stay apprized of all nodes currently present on DSB 150. In any event, DSB control module 152 finds the appropriate node entry in node map 154 which corresponds to VDC 144 for network printer 15 (step S1302) and sends node address 178 of the corresponding node entry to network management FAM 121.

Network management FAM 121 then contacts VDC 144 by sending a bus message over DSB 150 to VDC 144 using the node address corresponding to VDC 144 (step S1303). Preferably, the bus message contains an identifier related to network management FCM 131 because network management FAM 121 wishes to communicate with network management FCM 131 to obtain functional support on behalf of ink jet printer for network management purposes. Virtual device container 144 responds to the bus message in step S1304 by sending a bus message to network management FAM 121 which contains the VDC's GUID and the common interface pointer for network management FCM 131. The VDC's GUID can be used subsequently in order to allow network management FAM 121 to establish a direct and more efficient communication connection with network management FCM 131. Next, network management FAM 121 sends a bus message over DSB 150 to network management FCM 131 using the VDC node address and the common interface pointer corresponding to network management FCM 131 (step S1305). In this manner, an indirect line of communication is established between network management FAM 121 and network management FCM 131 for supporting bus messages sent back and forth between the two nodes via DSB 150 for either data-exchange or function-call purposes. Flow then passes to return in step S1306.

Returning to FIG. 10, flow passes to step S1004 in which network management FAM 121 establishes a direct COM connection with network management FCM 131, thereby establishing a direct and more efficient connection between the two nodes for supporting data exchange and function calls. Step S1004 is described in more detail in the flowchart of FIG. 14.

Figure 14:
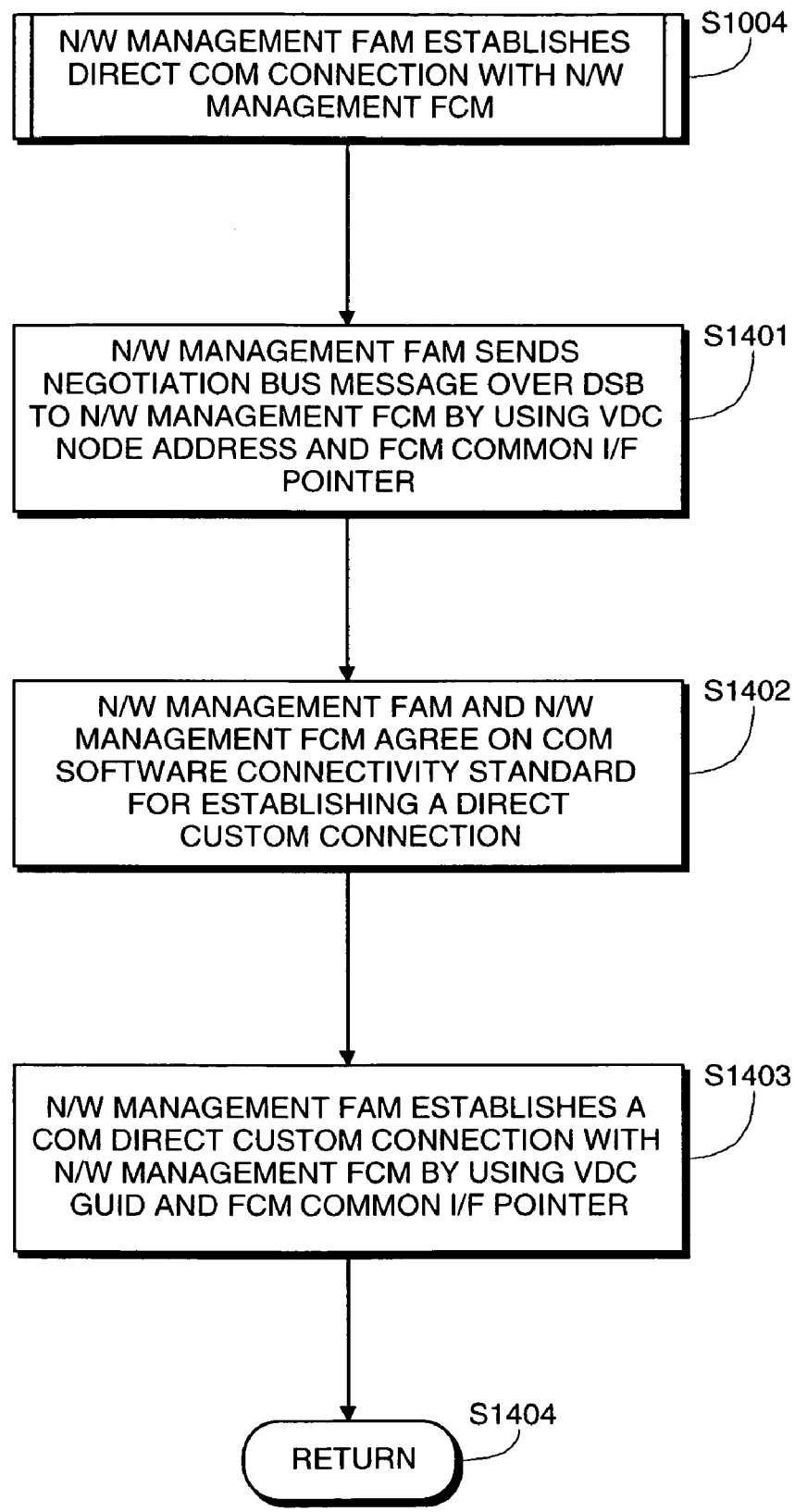
FIG. 14 is a flowchart for explaining how two nodes establish a direct custom connection according to one embodiment of the present invention.

Accordingly, turning to step S1401 of FIG. 14, network management FAM 121 sends a negotiation bus message over DSB 150 to network management FCM 131 by using the node address corresponding to VDC 144 and the common interface pointer for FCM 131. The negotiation bus message initiates a series of negotiation bus messages between network management FAM 121 and network management FCM 131 during which the two nodes agree upon a software connectivity standard for supporting a direct custom connection. In step S1402, network management FAM 121 and network management FCM 131 agree on using the "COM" software connectivity standard for establishing a direct custom connection. COM is supported by functions 159 of operating system 46. In step S1403, network management FAM 121 establishes direct custom COM connection 195 with network management FCM 131 by using the globally-unique identifier of VDC 144 and the common interface pointer of network management FCM 131 which were previously sent to network management FAM 121. Accordingly, network management FAM 121 and network management FCM 131 can now conduct data exchange and function calls between themselves via direct COM connection 195. Flow then passes to return in step S1404. It should be noted that COM is only one example of a direct-connection software connectivity standard that can be utilized in the present invention. Accordingly, other software connectivity standards can be utilized such as JAVA, JINI, CORBA, etc. Therefore, there is a greater probability that two nodes on DSB 150 can find a commonly-supported software connectivity standard in order to establish a direct custom connection.

Returning to the flowchart of FIG. 10, flow passes to S1005 in which network management FAM 121 sends a function request via direct COM connection 195 to network management FCM 131. It can be appreciated that the function request can contain either a request for data exchange to and from network printer 15, or a function request requiring a function to be performed either virtually in network management FCM 131 or actually in network printer 15. Network management FCM 131 receives the function request via COM connection 195 from network management FAM 121 in step S1006. In step S1007, network management FCM 131 is selected in response to receipt of the function request to support the function request. Accordingly, in step S1008, network management FCM 131 executes the function request and concurrently communicates with the network device which it supports, network printer 15, via network 10 to support execution of the function request. For example, the function request may require network management FCM 131 to read and/or write information to/from a memory in network printer 15, such as a memory on a network interface board of network printer 15. Flow then passes to return in step S1009.

Figure 15:
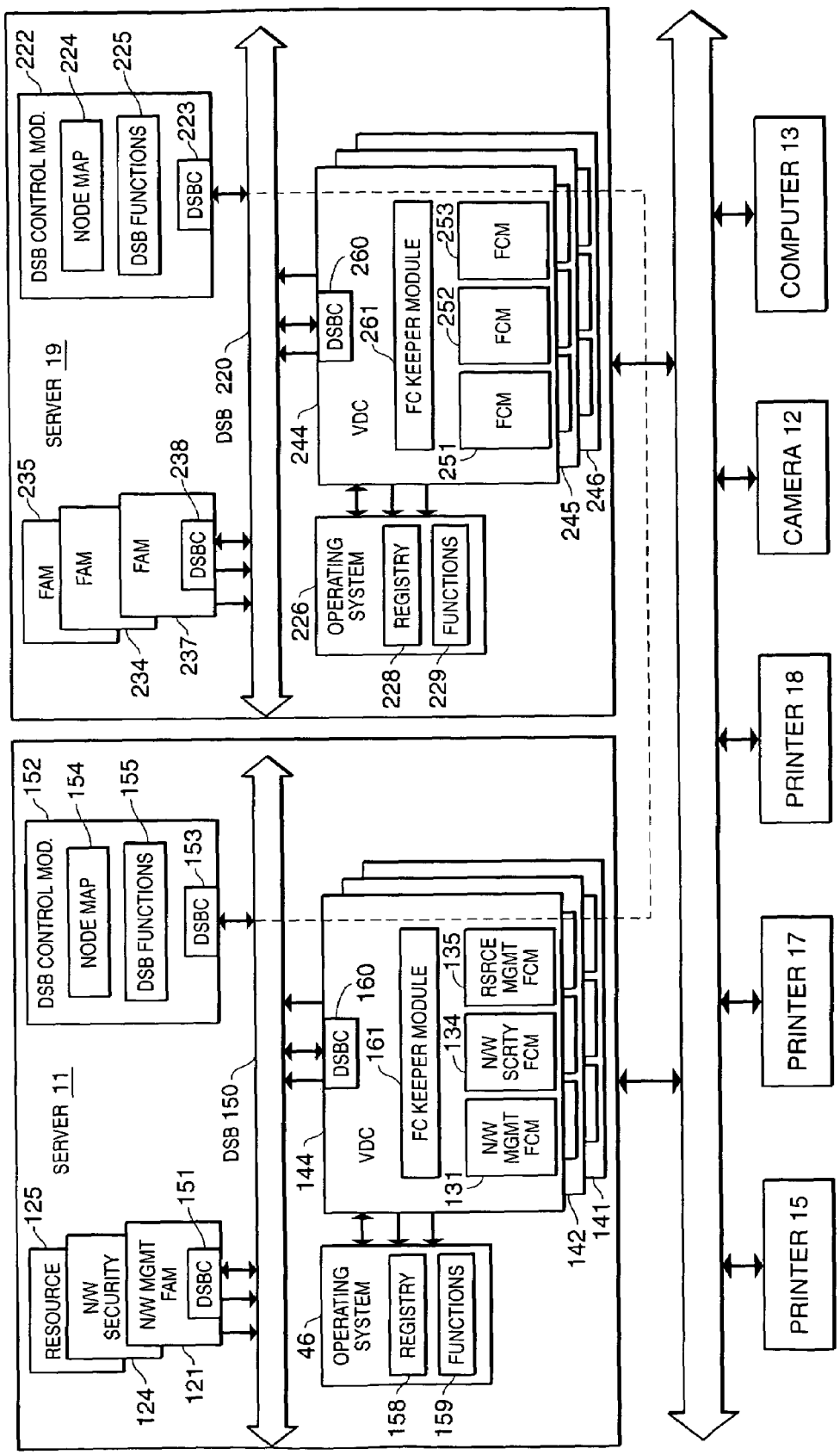
FIG. 15 is a functional block diagram for explaining a distributed object-based architecture according to another embodiment of the present invention.

FIG. 15 provides another embodiment of the present invention in which the object-based architecture is extended to accommodate a distributed network environment having two or more servers. In general, the distributed architecture depicted in FIG. 15 operates in the same fashion as the single-server implementation depicted in FIGS. 6 and 8 and described above. However, as seen in FIG. 15, servers 11 and 19 on network 10 each implement a local version of the architecture discussed above. In particular, server 19 is seen to have a duplicate architecture of that depicted in server 11 of FIG. 6. Accordingly, server 19 has FAMs 235, 236 and 237, DSB control module 222, VDCs 244, 245 and 246, and operating system 226 similar to that provided in server 11.

In this distributed system, each one of servers 11 and 19 have a local dedicated software bus (DSB) with a local DSB control module. VDCs 244 to 246 of server 19 are provided to virtually extend the functional capabilities of other network devices on network 10 which do not already have corresponding VDCs in server 11. For example, printer 18 may be represented by VDC 237 of server 19. The distributed architecture of FIG. 15 can therefore be useful in a large distributed environment in which each of a plurality of servers are used to manage a plurality of network devices. As mentioned above, the components in server 19 operate in the same manner as that described above for the single-server embodiment, except that communication on each of the local DSBs 150 and 220 can be extended across the platforms of servers 11 and server 19. Accordingly, nodes on DSB 150 can communicate with nodes on DSB 220, because DSBs 150 and 220 are virtually connected to each other over network 10.

This cross-platform extension of DSB's 150 and 220 is accomplished by designating one of DSB control modules 152 and 220 as a global DSB controller, wherein the node map of the designated global DSB controller acts as a global node map. For example, when DSB control module 152 is started, its announcement message is propagated over network 10. If DSB control module 222 of server 19 does not reply with an acknowledgment message, then DSB control module 152 assumes that it is the designated global DSB controller for network 10. On the other hand, if DSB control module 222 of server 19 does reply with an acknowledgment message, then DSB control module 222 is assumed to be the designated global DSB controller because it was the first one present on network 10. Therefore, the first DSB control module to announce its presence on network 10 is generally the designated global DSB controller.

Assuming that DSB control module 222 of server 19 is the designated global DSB controller, all node entries of DSB control module 152 are also copied to DSB control module 222. For example, when DSB control module 152 detects the presence of DSBC 151 on DSB 150, DSB control module 152 creates a node entry in node map 154 corresponding to DSBC 151, and sends a copy of the node entry to DSB control module 222 over network 10. In order to communicate across network 10, a common software connectivity standard such as COM can be used, although standards such as MSMQ, JINI/JAVA, XML, IFTP, and DCOM can be used. Initial contact between DSB control modules 152 and 220 therefore involves handshaking in order to determine which standard to use to for communication between DSBs 150 and 220.

The distributed architecture therefore allows a node on DSB 150 to communicate with a node on DSB 220 in much the same manner as the single-server implementation described above, with the difference that the designated global DSB controller is used to find a desired node and that cross-platform bus message communications are conducted in the agreed upon standard, such as COM.

Figure 16:
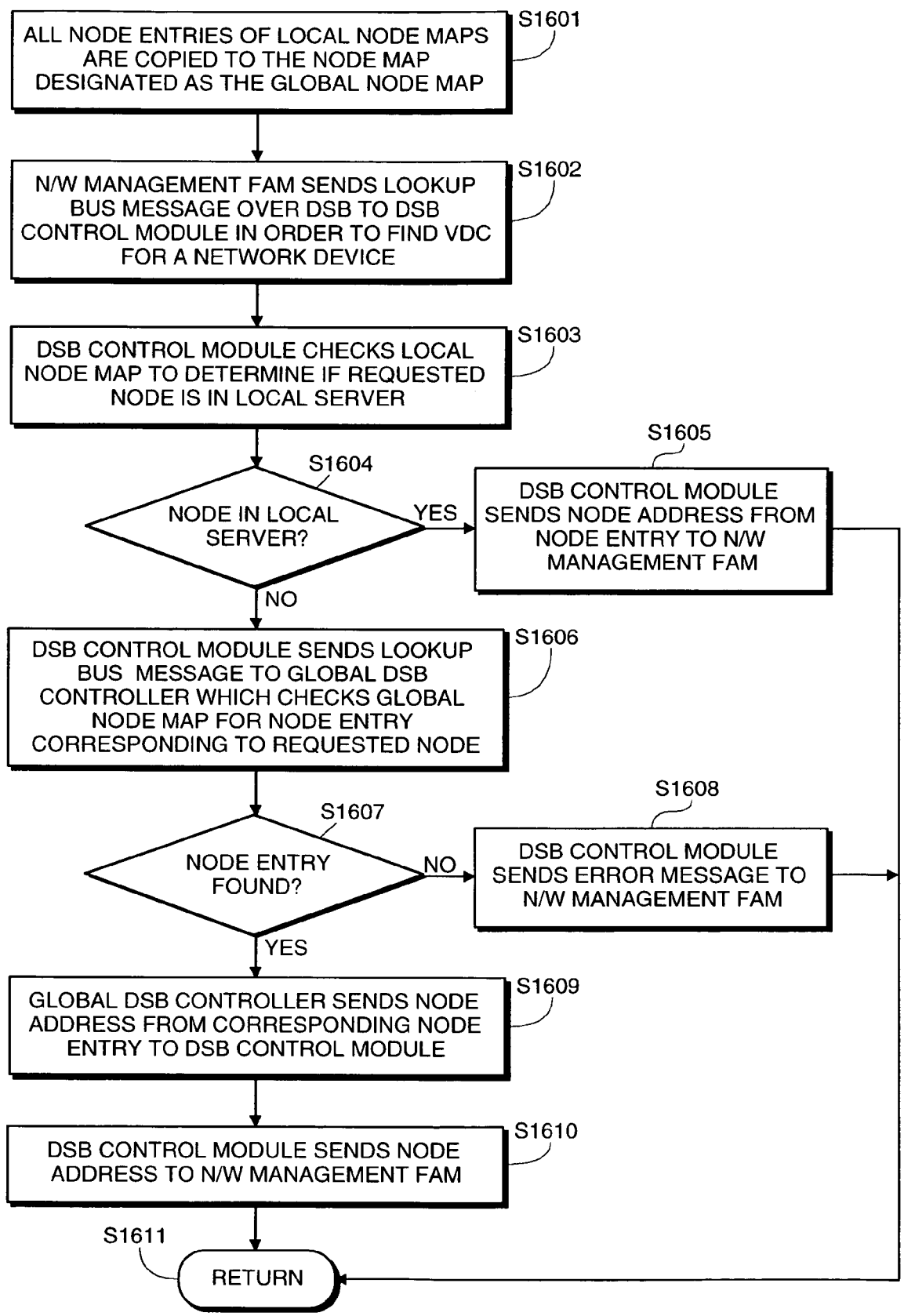
FIG. 16 is a flowchart for explaining the operation of the distributed object-based architecture depicted in FIG. 15.

FIG. 16 provides a flowchart for explaining the use of the distributed architecture depicted in FIG. 15. In step S1601, all node entries of node maps 154 is copied to the designated global node map, in this case node map 224, as described above. Next, in step S1602, network management FAM 121 sends a lookup bus message over DSB 150 to DSB control module 152 in order to find the node address for the VDC which corresponds to printer 18, which in this example is VDC 244. DSB control module 154 then checks node map 154 to determine if a node entry corresponding to printer 18 is present (step S1603). If it is determined in step S1604 that node map 154 does contain the requested node entry, then DSB control module 152 sends the node address from the node entry to network management FAM 121 (step S1605) and flow passes to return in step 1611. In this example, however, it is determined in step S1604 that node map 154 does not contain the requested node entry because printer 18 is handled by server 19. Accordingly, DSB control module 152 sends the lookup bus message over network 10 to DSB control module 222 which is the designated global DSB controller (step S1606).

DSB control module 222, acting as the global DSB controller, then checks node map 224, which is acting as the designated global node map, to determine if a node entry exists which corresponds to printer 18 (steps S1606 and S1607). If not, DSB control module 152 receives an error message from DSB control module 222, which is then passed back to network management FAM 121 (step S1608). If it is determined in step S1607 that node map 224 does contain the requested node entry, then DSB control module 222 sends the node address from the node entry to DSB control module 152 (step S1609), which in turn sends the node address to network management FAM 121 (step S1610). Control then passes to return in step S1611.

It should be noted that other embodiments for supporting DSBs 150 and 220 are possible in both the single-server embodiment of FIG. 6 and the cross-platform, distributed embodiment of FIG. 15. For example, it is possible to incorporate the functions of DSB control modules 152 and 222 into each of the DSB connectors (DSBCs). Therefore, DSB control modules 152 and 222 would not be needed, and one of the DSCBs on each of DSB 150 and 222 could act as the local master for that particular DSB. This of course would require that each DSBC contain the functionality of a DSB control module, including node map and DSB functions.

Based on the above discussion and accompanying figures, an open, object-based architecture is provided to virtually extend the functional capabilities of network devices on a network in order to allow legacy devices to support both pre-existing and new network-based applications, such as network management applications and the like. It should be noted that the protocols used herein and examples of network-based applications used herein are for illustrative purposes and that the object-based architecture of the present invention can be used to support various different protocols and network-wide applications in order to virtually extend the functional capabilities of network devices.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A computer-implemented method for providing a virtual device container to virtually extend the functionality of a network device on a network for supporting a plurality of functional application modules residing in a server on the network, said method comprising the steps of:

receiving a function request sent from one of the functional application modules, the function request corresponding to the network device;

selecting one of a plurality of functional component modules in response to the function request, each of the functional component modules corresponding to a respective one of the functional application modules, the selected functional component module corresponding to the functional application module which sent the function request; and executing the selected functional component module according to the function request, wherein each functional component module communicates with the corresponding functional application module through a first interface and communicates with the network device through a second interface;

wherein the first interface is a dedicated software bus, the software bus being managed by a software bus control module, and wherein each of said functional component modules and each of said functional application modules contain a software bus connector module which supports communication over the dedicated software bus.

2. A method according to claim 1, wherein each functional application module implements a different network-wide application.

3. A method according to claim 2, wherein each functional component module provides functional support on behalf of the network device for each corresponding functional application module, respectively.

4. A method according to claim 1, wherein one of the separate functional application modules implements an email printing application.

5. A method according to claim 1, wherein one of the separate functional application modules implements a network management application.

6. A method according to claim 1, wherein one of the separate functional application modules implements a network security application.

7. A method according to claim 1, wherein one of the separate functional application modules implements a resource management application.

8. A method according to claim 1, wherein one of the separate functional, application modules implements a print job accounting application.

9. A method according to claim 1, further including the step of providing a description of each of the plurality of functional component modules for access by each of the plurality of functional application modules.

10. A method according to claim 1, wherein the function request contains a reference to one of the plurality of functional component modules.

11. A method according to claim 1, wherein the function request is a function call which is supported by one of the plurality of functional component modules.

12. A method according to claim 1, wherein the function request is supported by an operating system component interoperability standard.

13. A method according to claim 1, wherein an operating system registry contains a registry entry corresponding to each of the plurality of functional component modules.

14. A method according to claim 13, further including the step of loading, by a functional component keeper module, the functional component module corresponding to each registry entry for the network device in the operating system registry.

15. A method according to claim 14, wherein the loading step is performed in response to an initialization command.

16. A method according to claim 1, wherein the function request is a request for information from the network device.

17. A method according to claim 1, wherein the function request is a request for the device to receive information.

18. A method according to claim 1, wherein the function request is a request for the network device to perform a function.

19. A method according to claim 1, wherein communication over the dedicated software bus between the software bus connector modules is implemented by using a plurality of different software bus messages.

20. A method according to claim 19, wherein one of the software bus messages is an information request from one of the functional application modules for identification information corresponding to one of the functional component modules.

21. A method according to claim 20, wherein, in response to the information request, identification information corresponding to the requested functional component module is sent to the requesting functional application module.

22. A method according to claim 21, wherein the requesting functional application module establishes a direct communication connection with the requested functional component module by using the identification information.

23. A method according to claim 22, wherein the direct communication connection is over a data channel of the dedicated software bus.

24. A method according to claim 22, wherein the direct communication connection is implemented in one of a plurality of different communication protocols.

25. A method according to claim 19, wherein one of the software bus messages is an information request for identification information corresponding to all functional component modules and functional application modules that have software bus connector modules.

26. A method according to claim 19, wherein one of the software bus messages is an event message for notifying all functional component modules and functional application modules of a software bus event.

27. A method according to claim 26, wherein the software bus event is a reset event.

28. A method according to claim 26, wherein the software bus event is a shutdown event.

29. A method according to claim 26, wherein the software bus event is a shutdown event.

30. A method according to claim 26, wherein the software bus event is a pause event.

31. A method according to claim 19, wherein one of the software bus messages is a subscription message from one of the software bus connector modules, wherein, in response to the subscription message, the dedicated software bus subsequently passes all software bus messages of a specified type to the requesting software bus connector module.

32. A method according to claim 19, wherein the software bus messages are supported by a plurality of different communication protocols.

33. A method according to claim 1, wherein the second interface is the network.

34. A method according to claim 1, wherein the second interface is a serial bus.

35. A method according to claim 1, wherein each functional component module reads data from a memory of the network device via the second interface.

36. A method according to claim 1, wherein each functional component module writes data to a memory of the network device via the second interface.

37. A method according to claim 1, wherein one of the functional application modules is a proxy application which provides a data interface over the network between the plurality of functional component modules and a third-party application.

38. A method according to claim 1, wherein the function request is a generic request which is supported in the selected functional component nodule by a plurality of specific protocol requests, and wherein one of the plurality of specific protocol requests is sent from the selected functional component module to the network device based on a desired protocol for communication with the network device.

39. A method according to claim 1, wherein a second plurality of functional component modules are used to support a second network device, and wherein each functional application module is supported by the corresponding functional component module for each network device.

40. A method according to claim 1, wherein the virtual device container is a DCOM server.

41. A method according to claim 40, wherein the function request is addressed to the device container.

42. A method according to claim 1, wherein the virtual device container registers an entry with the dedicated software bus, the entry containing a node address corresponding to the virtual device container.

43. A method according to claim 42, wherein the virtual device container obtains a globally unique identifier through an operating system function call.

44. A method according to claim 43, wherein each of the functional application modules has access to the globally unique identifier from the virtual device container by using the node address, whereupon a direct software connection is available to the virtual device container by using the globally unique identifier.

45. A method according to claim 42, wherein at least one of the functional application modules establishes a direct software connection to the virtual device container by using the node address of the virtual device container.

46. A method according to claim 45, wherein the direct software connection is supported by COM function calls.

47. A method according to claim 45, wherein the direct software connection is supported by JAVA function calls.

48. A method according to claim 45, wherein the direct software connection is supported by CORBA function calls.

49. A method according to claim 43, wherein the globally unique identifier is obtained from an operating system function call.

50. A method according to claim 43, wherein the function request is received over a direct software connection between the corresponding functional application module and the virtual device container, the direct software connection being established based on the globally unique identifier.

51. A computer-implemented method for providing a virtual device container to virtually extend the functionality of a network device on a network for supporting a plurality of functional application modules residing in a server on the network, said method comprising the steps of:
    loading, by a functional component keeper module in the virtual device container, a plurality of functional component modules corresponding to a plurality of registry entries in an operating system registry, each of the functional component modules corresponding to a respective one of the functional application modules;

establishing a direct connection between a requesting one of the functional application modules and the virtual device container over a dedicated software bus by using a globally unique identifier which corresponds to the virtual device container and which is obtained from the virtual device container via the dedicated software bus;

receiving, over the direct connection, a function request sent from the requesting functional application module, the function request corresponding to the network device and containing a function call;

selecting one of a plurality of functional component modules for supporting the function call, the selected functional component module corresponding to the requesting functional application module; and executing the selected functional component module according to the function call, wherein each functional component module communicates with the network device through the network;

wherein each functional component module communicates with a corresponding functional application module through a first interface comprising a dedicated software bus which is managed by a software bus control module, and wherein each of said functional component modules and each of said functional application modules contain a software bus connector module which supports communication over the dedicated software bus.

52. A network computing device for providing a virtual device container to virtually extend the functionality of a network device on a network for supporting a plurality of functional application modules residing in a server on the network, comprising:

a program memory for storing executable process steps; and a processor for executing the process steps stored in said program memory;

wherein said executable process steps comprise (a) a step to receive a function request sent from one of the functional application modules, the function request corresponding to the network device, (b) a step to select one of a plurality of functional component modules in response to the function request, each of the functional component modules corresponding to a respective one of the functional application modules, the selected functional component module corresponding to the functional application module which sent the function request, and (c) a step to execute the selected functional component module according to the function requests, wherein each functional component module communicates with the corresponding functional application module through a first interface and communicates with the network device through a second interface;

wherein the first interface is a dedicated software bus, the software bus being managed by a software bus control module, and wherein each of said functional component modules and each of said functional application modules contain a software bus connector module which supports communication over the dedicated software bus.

53. A computer-readable medium which stores computer-executable process steps, the computer-executable process steps to provide a virtual device container to virtually extend the functionality of a network device on a network for supporting a plurality of functional application modules residing in a server on the network, said computer-executable process steps comprising (a) a step to receive a function request sent from one of the functional application modules, the function request corresponding to the network device, (b) a step to select one of a plurality of functional component modules in response to the function request, each of the functional component modules corresponding to a respective one of the functional application modules, the selected functional component module corresponding to the functional application module which sent the function request, and (c) a step to execute the selected functional component module according to the function request, wherein each functional component module communicates with the corresponding functional application module through a first interface and communicates with the network device through a second interface;

wherein the first interface is a dedicated software bus, the software bus being managed by a software bus control module, and wherein each of said functional component modules and each of said functional application modules contain a software bus connector module which supports communication over the dedicated software bus.

54. Computer-executable process steps for providing a virtual device container to virtually extend the functionality of a network device on a network for supporting a plurality of functional application modules residing in a server on the network, wherein said computer-executable process steps are stored on a computer-readable medium and comprise (a) a step to receive a function request sent from one of the functional application modules, the function request corresponding to the network device, (b) a step to select one of a plurality of functional component modules in response to the function request, each of the functional component modules corresponding to a respective one of the functional application modules, the selected functional component module corresponding to the functional application module which sent the function request, and (c) a step to execute the selected functional component module according to the function request, wherein each functional component module communicates with the corresponding functional application module through a first interface and communicates with the network device through a second interface;

wherein the first interface is a dedicated software bus, the software bus being managed by a software bus control module, and wherein each of said functional component modules and each of said functional application modules contain a software bus connector module which supports communication over the dedicated software bus.

* * * * *

UNITED STATES PATENT AND TRADEMARK OFFICE
CERTIFICATE OF CORRECTION

PATENT NO. : 7,082,608 B2
APPLICATION NO. : 09/664531
DATED : July 25, 2006
INVENTOR(S) : Richard Wilson et al.

It is certified that error appears in the above-identified patent and that said Letters Patent is hereby corrected as shown below:

COLUMN 16
    Line 56, "DSB. 150" should read --DSB 150--.

COLUMN 24
    Line 36, "email" should read --e-mail--; and
    Line 47, "functional," should read --functional--.

COLUMN 25
    Line 9, "for the" should read --for the network--; and
    Line 49, "shutdown" should read --startup--.

COLUMN 26
    Line 14, "nodule" should read --module--; and
    Line 28, "device" should read --virtual device--.

COLUMN 27
    Line 52, "requests," should read --request,--.

Signed and Sealed this

Third Day of April, 2007

JON W. DUDAS
*Director of the United States Patent and Trademark Office*